US010783309B2

(12) United States Patent
Abe et al.

(10) Patent No.: US 10,783,309 B2
(45) Date of Patent: Sep. 22, 2020

(54) METHOD FOR OUTPUTTING IMPACT DEGREE AND INFORMATION PROCESSING DEVICE

(71) Applicant: FUJITSU LIMITED, Kawasaki-shi, Kanagawa (JP)

(72) Inventors: Mitsunori Abe, Kawasaki (JP); Yoshiyuki Hiroshima, Nakano (JP); Takahiro Kitagawa, Kawasaki (JP); Akiko Matsui, Meguro (JP); Naoki Nakamura, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/502,074

(22) Filed: Jul. 3, 2019

(65) Prior Publication Data

US 2020/0026816 A1 Jan. 23, 2020

(30) Foreign Application Priority Data

Jul. 19, 2018 (JP) ................................ 2018-135831

(51) Int. Cl.
*G06F 30/39* (2020.01)
*G06F 119/08* (2020.01)
*G01B 21/32* (2006.01)

(52) U.S. Cl.
CPC ............ *G06F 30/39* (2020.01); *G01B 21/32* (2013.01); *G06F 2119/08* (2020.01)

(58) Field of Classification Search
USPC ........................................................ 716/112
See application file for complete search history.

(56) References Cited

U.S. PATENT DOCUMENTS

2017/0277822 A1* 9/2017 Clark ..................... G06F 30/39

FOREIGN PATENT DOCUMENTS

JP 2001-125945 5/2001
JP 2006-313800 11/2006

* cited by examiner

*Primary Examiner* — Bryce M Aisaka
(74) *Attorney, Agent, or Firm* — Fujitsu Patent Center

(57) ABSTRACT

An information processing device includes a processor that calculates a distortion amount that represents an amount of distortion generated in a via of a printed circuit board based on a following equation, $\Delta\varepsilon=\{(L\times\alpha\times\Delta t\times E)/(D\times T)\}\times m\times\beta\times\gamma\times\eta$; calculates a lifetime of the via based on a following equation, $M=N/(n\times365)$; changes, when the calculated lifetime is outside a first setting range, at least two design values of the via length, the thermal expansion coefficient, the Young's modulus, the via diameter, or the plating thickness within a second setting range corresponding to the at least two design values respectively; gives points of two perspectives affected by the change and outputs a graph that indicates an impact degree according to the points of the two perspectives for each combination of the at least two design values.

15 Claims, 22 Drawing Sheets

| USER NAME: FUJI TARO | |
|---|---|
| VIA LENGTH | 1.8mm |
| VIA DIAMETER | 0.25mm |
| PLATING THICKNESS | 10 μm |
| THERMAL EXPANSION COEFFICIENT | 70 1/K |
| GLASS TRANSITION TEMPERATURE | 145 °C |
| YOUNG'S MODULUS | 19 GPa |
| MAXIMUM TEMPERATURE | 90 °C |
| MINIMUM TEMPERATURE | 25 °C |
| NUMBER OF TEMPERATURE CHANGES | 5 TIMES/DAY |
| REQUIRED NUMBER OF YEARS | 5 YEARS |
| SAFETY FACTOR | 1.5 |

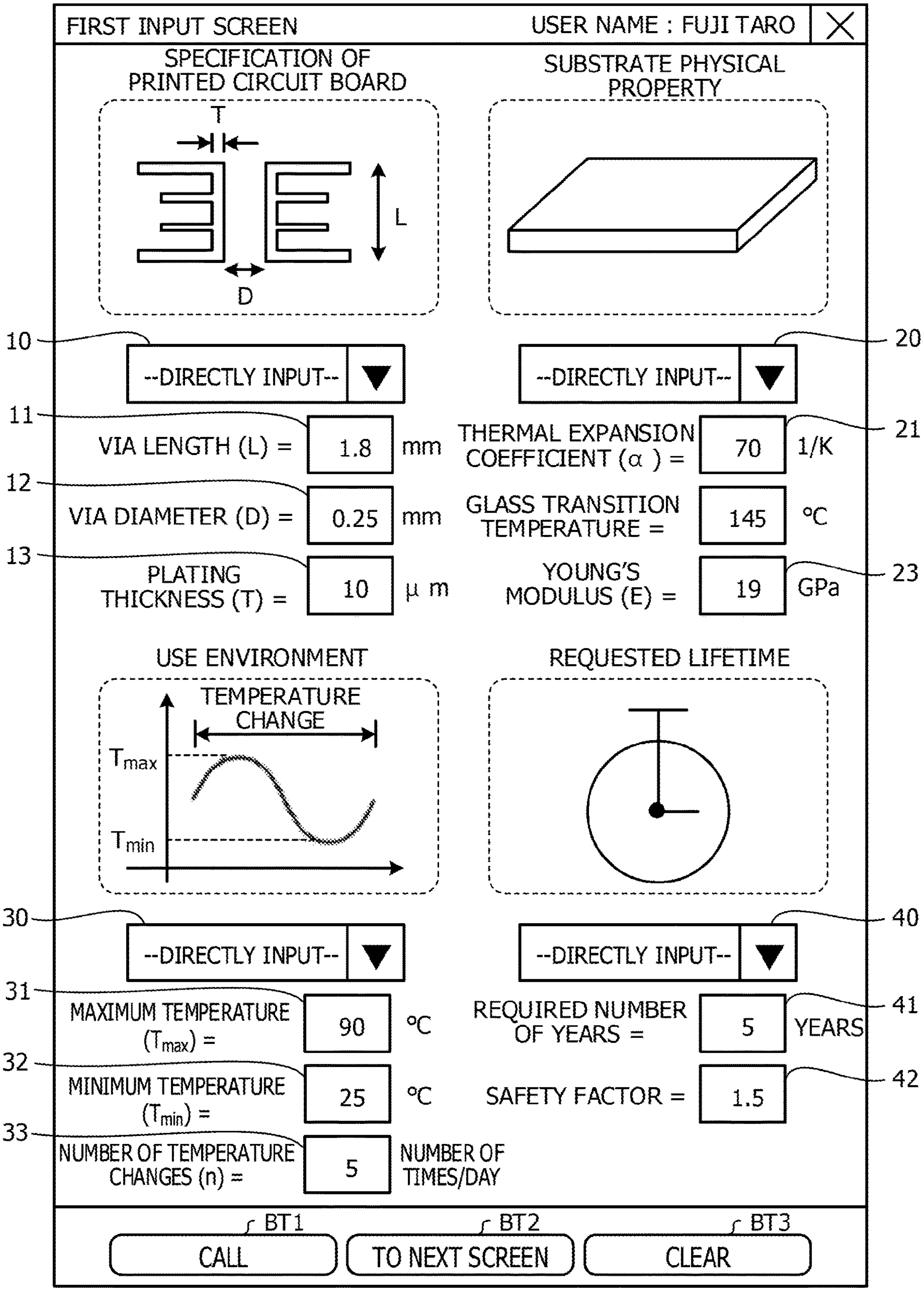

FIG. 7

| FIRST INPUT SCREEN | | USER NAME : FUJI TARO | X |

SPECIFICATION OF PRINTED CIRCUIT BOARD | SUBSTRATE PHYSICAL PROPERTY

10 — --DIRECTLY INPUT-- ▼    20 — --DIRECTLY INPUT-- ▼

11 — VIA LENGTH (L) = 1.8 mm    THERMAL EXPANSION COEFFICIENT (α) = 70  1/K — 21

12 — VIA DIAMETER (D) = 0.25 mm    GLASS TRANSITION TEMPERATURE = 145 °C — 22

13 — PLATING THICKNESS (T) = 10 μm    YOUNG'S MODULUS (E) = 19 GPa — 23

USE ENVIRONMENT | REQUESTED LIFETIME

30 — --DIRECTLY INPUT-- ▼    40 — --DIRECTLY INPUT-- ▼

31 — MAXIMUM TEMPERATURE ($T_{max}$) = 90 °C    REQUIRED NUMBER OF YEARS = 5 YEARS — 41

32 — MINIMUM TEMPERATURE ($T_{min}$) = 25 °C    SAFETY FACTOR = 1.5 — 42

33 — NUMBER OF TEMPERATURE CHANGES (n) = 5 NUMBER OF TIMES/DAY

BT1 CALL | BT2 TO NEXT SCREEN | BT3 CLEAR

NO LAND IN
INTERNAL LAYER
$\beta$ =1.0

LAND IN
FIRST LAYER
$\beta$ =1.0

LAND IN
CENTRAL LAYER
$\beta$ =1.2

LANDS IN
ALL LAYERS
$\beta$ =1.6

VIA DENSITY : 32/cm$^2$
$\gamma$ = 1.3

VIA DENSITY : 16/cm$^2$
$\gamma$ = 1.0

VIA DENSITY : 8/cm$^2$
$\gamma$ = 0.8

VIA DENSITY : 4/cm$^2$
$\gamma$ = 0.7

RANK A (DEVIATION=0 $\mu$m)

$\eta$ = 1.0

RANK B (0 $\mu$m <DEVIATION ≦ 100 $\mu$m)

$\eta$ = 1.1

RANK C (100 $\mu$m <DEVIATION )

$\eta$ = 1.3

| OUTPUT SCREEN | USER NAME : FUJI TARO | ✕ |

● PREDICTION RESULT

VIA LIFETIME (SAFETY FACTOR: 1) = [ ] YEARS — 61

DETERMINATION ON REQUIRED NUMBER OF YEARS= [ ] — 62

VIA LIFETIME (SAFETY FACTOR: INPUT VALUE) = [ ] YEARS — 63

DETERMINATION ON REQUIRED NUMBER OF YEARS= [ ] — 64

| OUTPUT SCREEN | USER NAME : FUJI TARO | ✕ |

● PREDICTION RESULT

VIA LIFETIME (SAFETY FACTOR: 1) = | 4.48 | YEARS — 61

DETERMINATION ON REQUIRED NUMBER OF YEARS = | NG | — 62

VIA LIFETIME (SAFETY FACTOR: INPUT VALUE) = | 2.99 | YEARS — 63

DETERMINATION ON REQUIRED NUMBER OF YEARS = | NG | — 64

POP-UP SCREEN ✕

PERFORM OPTIMIZATION CALCULATION?

[ YES ]  [ NO ]

| SETTING SCREEN | | | | ✕ |
|---|---|---|---|---|
| SELECT CHANGEABLE FACTOR AND INPUT SETTING RANGE! | | | | |
| CHANGE | CHANGEABLE FACTOR | SETTING RANGE | | UNIT |
| ☐ | VIA LENGTH | ☐ ~ ☐ | | mm |
| ☑ | VIA DIAMETER | 0.15 ~ 0.35 | | mm |
| ☑ | PLATING THICKNESS | 5 ~ 30 | | μm |
| ☑ | THERMAL EXPANSION COEFFICIENT | 50 ~ 90 | | 1/k |
| ☐ | YOUNG'S MODULUS | ☐ ~ ☐ | | GPa |

BT7 — OPTIMIZATION CALCULATION

CANCEL — BT8

FIG. 15

| OBJECT TO BE CHANGED | VIA DIAMETER | | | PLATING THICKNESS | | | THERMAL EXPANSION COEFFICIENT | | | |
|---|---|---|---|---|---|---|---|---|---|---|
| INITIAL DESIGN VALUE | 0.25 | | | 10 | | | 70 | | | |
| SETTING RANGE | 0.15-0.35 | | | 5-30 | | | 50-90 | | | |
| CALCULATION RESULT | DESIGN VALUE AFTER CHANGE | COST POINT | MINIATURIZATION POINT | DESIGN VALUE AFTER CHANGE | COST POINT | MINIATURIZATION POINT | DESIGN VALUE AFTER CHANGE | COST POINT | MINIATURIZATION POINT | |
| | : | : | : | : | : | : | : | : | : | |
| | 0.15 | -2 | 1 | 15 | 0 | 0 | 70 | 0 | 0 | |
| | : | : | : | : | : | : | : | : | : | P |
| | 0.3 | 0 | -1 | 15 | 0 | 0 | 70 | 0 | 0 | |
| | 0.35 | 1 | -2 | 15 | 0 | 0 | 70 | 0 | 0 | |
| | : | : | : | : | : | : | : | : | : | |
| | 0.15 | -2 | 1 | 15 | 0 | 0 | 65 | -1 | 0 | |
| | 0.2 | -1 | 1 | 15 | 0 | 0 | 65 | -1 | 0 | Q |
| | : | : | : | : | : | : | : | : | : | |
| | 0.35 | 1 | -2 | 15 | 0 | 0 | 65 | -1 | 0 | |

FIG. 16

COST ALLOCATION POINT TABLE

| CHANGEABLE FACTOR | POINT | | | |
|---|---|---|---|---|
| VIA DIAMETER | DESIGN VALUE AFTER CHANGE 0.15mm OR LESS | DESIGN VALUE AFTER CHANGE 0.15 TO 0.25mm | DESIGN VALUE AFTER CHANGE 0.25 TO 0.35mm | DESIGN VALUE AFTER CHANGE 0.35mm OR MORE |
| | -2 POINTS | -1 POINT | 0 POINT | +1 POINT |
| PLATING THICKNESS | INITIAL DESIGN VALUE -5 μm OR LESS | INITIAL DESIGN VALUE -5 TO +5 μm | INITIAL DESIGN VALUE +5 TO 15 μm | INITIAL DESIGN VALUE +15 μm OR MORE |
| | +1 POINT | 0 POINT | -1 POINT | -2 POINTS |
| THERMAL EXPANSION COEFFICIENT | INITIAL DESIGN VALUE -15 OR LESS | INITIAL DESIGN VALUE -15 TO -5 μm | INITIAL DESIGN VALUE -5 TO +5 μm | INITIAL DESIGN VALUE +5 OR MORE |
| | -2 POINTS | -1 POINT | 0 POINT | +1 POINT |

FIG. 17

MINIATURIZATION ALLOCATION POINT TABLE

| CHANGEABLE FACTOR | POINT | | | |
|---|---|---|---|---|
| VIA DIAMETER | INITIAL DESIGN VALUE -0.05 OR LESS | INITIAL DESIGN VALUE -0.05 TO +0.05mm | INITIAL DESIGN VALUE +0.05 TO 0.10mm | INITIAL DESIGN VALUE +0.10mm OR MORE |
| | +1 POINT | 0 POINT | -1 POINT | -2 POINTS |
| PLATING THICKNESS | INITIAL DESIGN VALUE -5 μm OR LESS | INITIAL DESIGN VALUE -5 TO +5 μm | INITIAL DESIGN VALUE +5 TO 15 μm | INITIAL DESIGN VALUE +15 μm OR MORE |
| | +1 POINT | 0 POINT | -1 POINT | -2 POINTS |
| THERMAL EXPANSION COEFFICIENT | 0 POINT | | | |

FIG. 18

| | LIFETIME | PASS OR FAIL | TOTAL COST POINT | TOTAL MINIATURIZATION POINT | TOTAL | |
|---|---|---|---|---|---|---|
| | : | : | : | : | : | |
| P | 3.69 | NG | -2 | 1 | -1 | |
| P | : | : | : | : | : | |
| P | 4.79 | NG | 0 | -1 | -1 | |
| P | 5.09 | OK | 1 | -2 | -1 | ⇐ BEST COST |
| | : | : | : | : | : | |
| Q | 6.94 | OK | -3 | 1 | -2 | |
| Q | 8.39 | OK | -2 | 1 | -1 | ⇐ BEST MINIATURIZATION |
| Q | : | : | : | : | : | |
| Q | 12.93 | NG | 0 | -2 | -2 | |

FIG. 19

| OBJECT TO BE CHANGED | VIA DIAMETER | | | PLATING THICKNESS | | | THERMAL EXPANSION COEFFICIENT | | | |
|---|---|---|---|---|---|---|---|---|---|---|
| INITIAL DESIGN VALUE | 0.25 | | | 10 | | | 70 | | | |
| SETTING RANGE | 0.15-0.35 | | | 5-30 | | | 50-90 | | | |
| CALCULATION RESULT | DESIGN VALUE AFTER CHANGE | COST POINT | MINIATURIZATION POINT | DESIGN VALUE AFTER CHANGE | COST POINT | MINIATURIZATION POINT | DESIGN VALUE AFTER CHANGE | COST POINT | MINIATURIZATION POINT | |
| | 0.35 | 1 | -2 | 15 | 0 | 0 | 70 | 0 | 0 | X |
| | 0.15 | -2 | 1 | 20 | -1 | -1 | 70 | 0 | 0 | Y |
| | : | : | : | : | : | : | : | : | : | |
| | 0.35 | 1 | -2 | 20 | -1 | -1 | 70 | 0 | 0 | |
| | 0.35 | 1 | -2 | 25 | -2 | -2 | 75 | 1 | 0 | Z |
| | : | : | : | : | : | : | : | : | : | |
| | 0.15 | -2 | 1 | 15 | 0 | 0 | 65 | -1 | 0 | W |
| | 0.2 | -1 | 1 | 15 | 0 | 0 | 65 | -1 | 0 | |
| | 0.25 | 0 | 0 | 15 | 0 | 0 | 65 | -1 | 0 | |

FIG. 20

| | LIFETIME | PASS OR FAIL | TOTAL COST POINT | TOTAL MINIATURIZATION POINT | TOTAL |
|---|---|---|---|---|---|
| X | 5.09 | OK | 1 | -2 | -1 |
| Y | 5.08 | OK | -3 | 0 | -3 |
| | : | : | : | : | : |
| | 7.91 | OK | 0 | -3 | -3 |
| Z | 5.19 | OK | 0 | -4 | -4 |
| | : | : | : | : | : |
| W | 6.94 | OK | -3 | 1 | -2 |
| | 8.39 | OK | -2 | 1 | -1 |
| | 9.85 | OK | -1 | 0 | -1 |

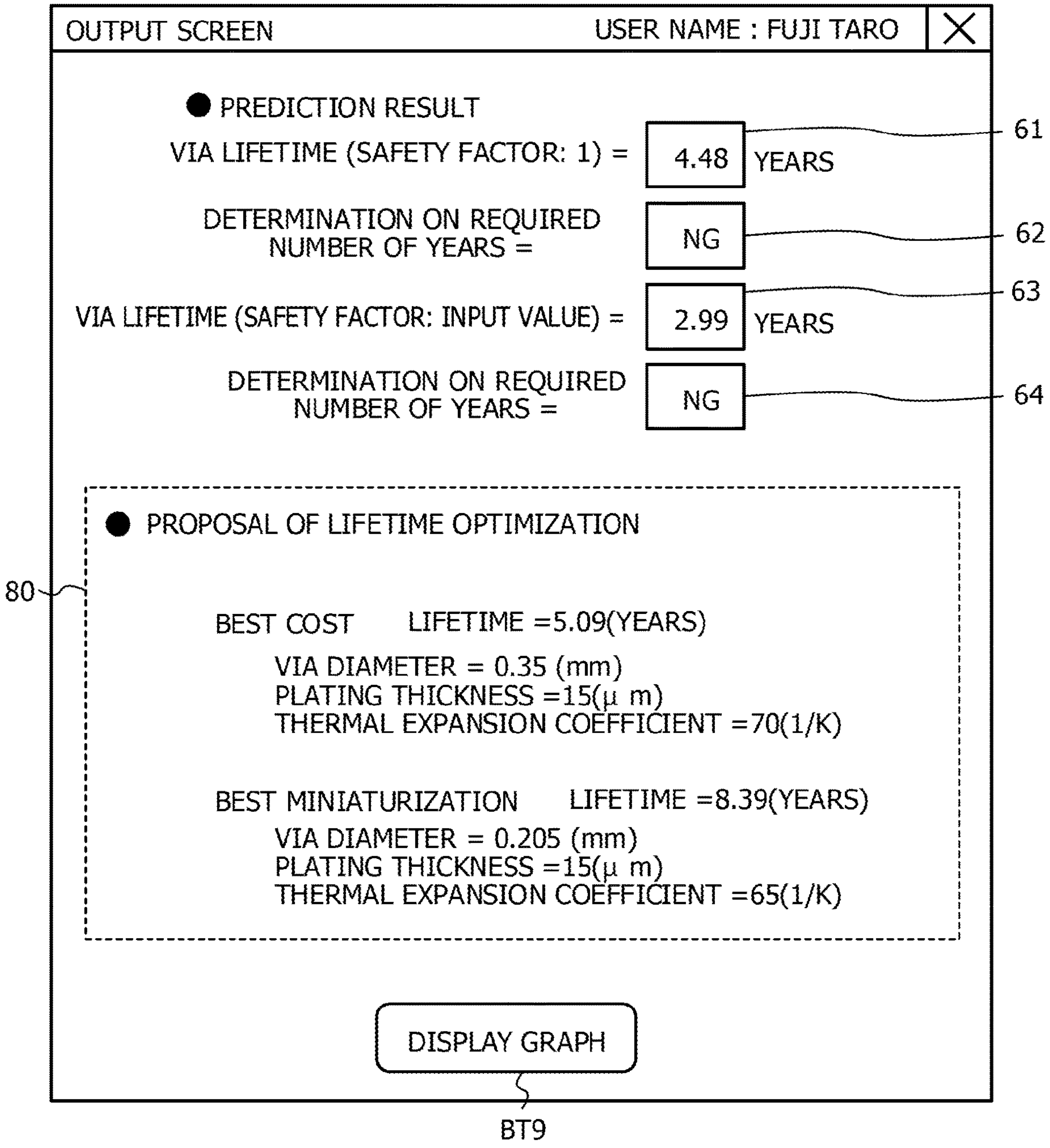

FIG. 21

| OUTPUT SCREEN | USER NAME : FUJI TARO | ✕ |

● PREDICTION RESULT

VIA LIFETIME (SAFETY FACTOR: 1) = | 4.48 | YEARS — 61

DETERMINATION ON REQUIRED NUMBER OF YEARS = | NG | — 62

VIA LIFETIME (SAFETY FACTOR: INPUT VALUE) = | 2.99 | YEARS — 63

DETERMINATION ON REQUIRED NUMBER OF YEARS = | NG | — 64

80 —

● PROPOSAL OF LIFETIME OPTIMIZATION

BEST COST    LIFETIME = 5.09 (YEARS)

VIA DIAMETER = 0.35 (mm)
  PLATING THICKNESS = 15($\mu$ m)
  THERMAL EXPANSION COEFFICIENT = 70 (1/K)

BEST MINIATURIZATION    LIFETIME = 8.39 (YEARS)

VIA DIAMETER = 0.205 (mm)
  PLATING THICKNESS = 15($\mu$ m)
  THERMAL EXPANSION COEFFICIENT = 65 (1/K)

DISPLAY GRAPH

BT9

METHOD FOR OUTPUTTING IMPACT DEGREE AND INFORMATION PROCESSING DEVICE

CROSS-REFERENCE TO RELATED APPLICATION

This application is based upon and claims the benefit of the prior Japanese Patent Application No. 2018-135831 filed on Jul. 19, 2018, the entire contents of which are incorporated herein by reference.

FIELD

The embodiments discussed herein are related to method for outputting an impact degree and an information processing device.

BACKGROUND

There is known a technique of predicting the fatigue lifetime of solder balls that join a printed circuit board and a semiconductor device. There is also known a technique of calculating a predicted value of the lifetime of a solder joint.

Related techniques are disclosed in, for example, Japanese Laid-open Patent Publication No. 2006-313800 and Japanese Laid-open Patent Publication No. 2001-125945.

Since the printed circuit board described above is a composite of an insulator material (e.g., an organic resin, a composite material of an organic resin and glass cloth, an inorganic material, etc.) and a conductive metal (e.g., copper, etc.), when the temperature outside the printed circuit board changes, an internal stress is generated in each of the insulator material and the metal. In particular, according to the internal stress generated in each of the insulator material and the metal, a crack may be generated in a via or a through hole (hereinafter, simply referred to as a via) in the printed circuit board due to the difference in the internal stress. Further, the term "via" refers to a plated hole that connects interlayers of a conductor layer requiring connection of two or more layers of printed circuit boards. Copper is often used for plating.

Here, since various electronic components such as a semiconductor device mounted on a printed circuit board are connected to each other through the vias, when a crack is generated in the vias, there is a possibility of causing a connection failure between the components. Thus, the crack generated in the via becomes a factor which reduces the connection resistance between the components. Therefore, the reliability of the printed circuit board or the electronic device in which the electronic component is mounted on the printed circuit board may be grasped at the design stage by calculating the lifetime of the vias based on the crack, but a technique of calculating the lifetime of the vias is not known.

Also, even when a technology of calculating the lifetime of the vias is established, the lifetime of the vias may be insufficient for the number of years for which a guarantee is required. Conversely, there may be cases where the lifetime of the vias is excessively filled over the number of years for which a guarantee is required (i.e., the quality is excessive). Therefore, in such a case, there is a need for a design change of the vias which prevents the shortage of the lifetime of the vias as well as the excessive quality with respect to the number of years for which the guarantee is required. Specifically, design changes such as a via diameter and a plating thickness are required at the design stage.

However, the design change of the vias may be adversely affected in several respects. For example, various costs such as product cost and manufacturing cost may increase together with the design change of the vias. In addition, there is also a possibility that miniaturization or densification (hereinafter, simply referred to as miniaturization) may be lost as the design of the vias is changed.

SUMMARY

According to an aspect of the embodiments, an information processing device includes a processor configured to: calculate a distortion amount that represents an amount of distortion generated in a via of a printed circuit board based on a following equation (1), $\Delta\varepsilon=\{(L\times\alpha\times\Delta t\times E)/(D\times T)\}\times m\times\beta\times\gamma\times\eta$ here, $\Delta\varepsilon$ is the distortion amount, L is a via length, $\alpha$ is a thermal expansion coefficient of a substrate of the printed circuit board, $\Delta t$ is a temperature change of an environment in which the printed circuit board is used, E is the Young's modulus of the substrate of the printed circuit board, D is a via diameter, T is a plating thickness inside the via, m is a coefficient obtained by a stress calculation based on a theory of material dynamics and by a stress simulation, $\beta$ is a first coefficient according to an arrangement of lands, $\gamma$ is a second coefficient according to an arrangement density of vias on the printed circuit board, and $\eta$ is a third coefficient according to a positional deviation between vias and lands; calculate a lifetime of the via based on a following equation, $M=N/(n\times365)$ here, M is the lifetime of the via, n is a number of temperature changes, and N is a number of cycles of the lifetime, which satisfies a following equation, $N^x=C/\Delta\varepsilon$ here, x is a fatigue ductility index of a material used for plating, C is a fatigue ductility coefficient of the material used for plating, and $\Delta\varepsilon$ is the distortion amount; change, when the calculated lifetime is outside a first setting range, at least two design values of the via length, the thermal expansion coefficient, the Young's modulus, the via diameter, or the plating thickness within a second setting range corresponding to the at least two design values respectively; give points of two perspectives affected by the change for each of the at least two changed design values; and output a graph that indicates an impact degree according to the points of the two perspectives for each combination of the at least two design values.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is an example of a first input screen;

FIG. 15 is a diagram for explaining an example of a combination of design values after a change of giving points;

FIG. 16 is an example of a cost allocation point table;

FIG. 17 is an example of a miniaturization allocation point table;

FIG. 18 is a diagram for explaining an example of a lifetime, a cost total point, a miniaturization total point, and a total according to the combination of design values after the change;

FIG. 19 is a diagram for explaining another example of a combination of design values after the change of giving points;

FIG. 20 is a diagram for explaining another example of a lifetime, a cost total point, a miniaturization total point, and a total according to the combination of design values after the change;

FIG. 21 is an example of an output screen including the output information and an optimum proposal.

DESCRIPTION OF EMBODIMENTS

Hereinafter, embodiments will be described with reference to the accompanying drawings.

Figure 1:
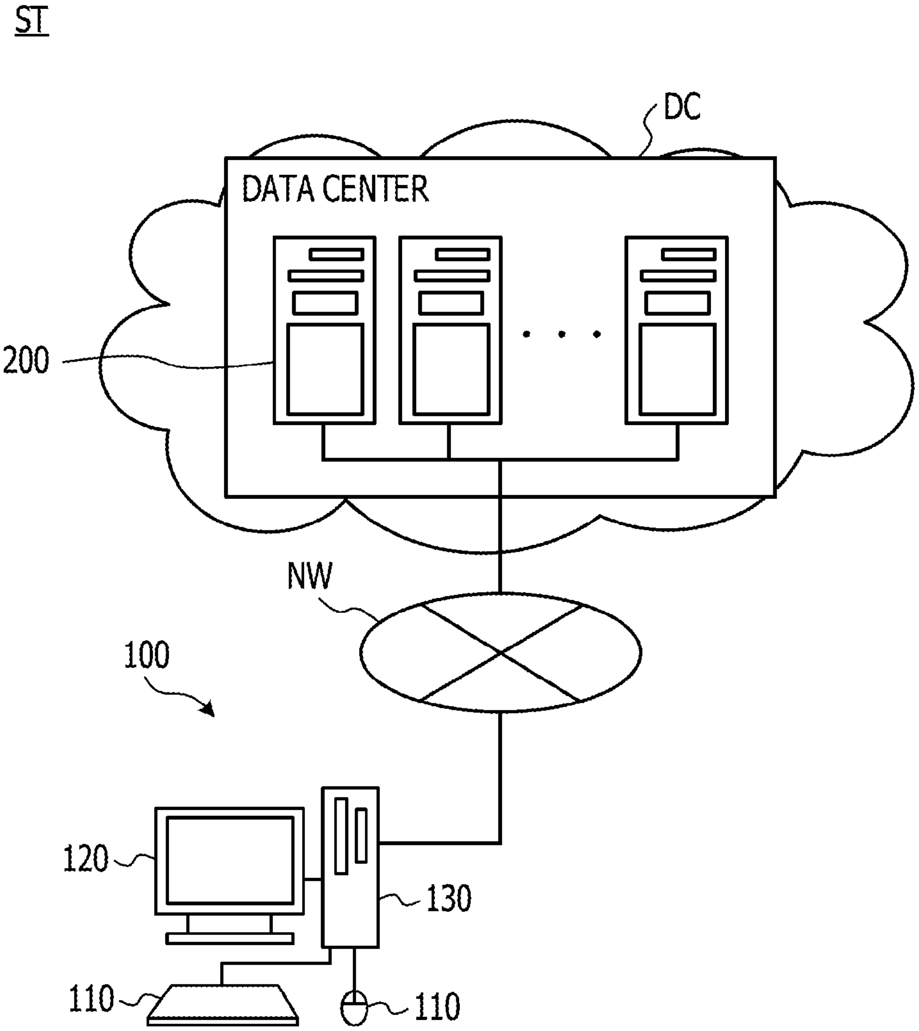
FIG. 1 is a diagram for explaining an example of an information processing system.

FIG. 1 is a diagram for explaining an example of an information processing system ST. The information processing system ST includes a terminal device 100 and a server device 200 serving as an information processing device. The terminal device 100 is used at a design stage by a designer of a via, a designer of a printed circuit board, and the like (hereinafter, simply referred to as a user). In FIG. 1, a personal computer (PC) is illustrated as an example of the terminal device 100, but may be a smart device. Examples of the smart device include a smartphone, a tablet terminal, and the like. Meanwhile, the server device 200 is disposed in a data center DC or the like that provides a cloud service. Thus, although the base of the server device 200 and the base of the terminal device 100 may be configured to be different from each other, the bases may be, for example, the same base in the same office. That is, the server device 200 may be a cloud type or an on-premise type.

The terminal device 100 and the server device 200 are connected to each other via a communication network NW. The communication network NW includes at least one of the Internet and a local area network (LAN). Therefore, the terminal device 100 may be connected to the server device 200 using wireless communication or wired communication. Further, when the terminal device 100 and the server device 200 are installed at the same site, a LAN which does not include the Internet is used as the communication network NW. In this case, the server device 200 is disposed in, for example, a server room or the like.

The terminal device 100 includes an input device 110, a display device 120, and a control device 130. The input device 110 and the display device 120 are connected to the control device 130. The control device 130 controls the display content of the display device 120 based on the input information input from the input device 110. In addition, the control device 130 transmits input information input from the input device 110 to the server device 200, and receives first screen information, output information, and the like transmitted from the server device 200. The control device 130 displays various screens on the display device 120 based on the received first screen information, and outputs the processing result of the server device 200 within a screen based on the received output information. The details of the first screen information and the output information will be described later.

Next, the hardware configuration of the server device 200 will be described with reference to FIG. 2. Further, the above-described control device 130 basically has the same hardware configuration as the server device 200, and thus, the description thereof is omitted.

Figure 2:
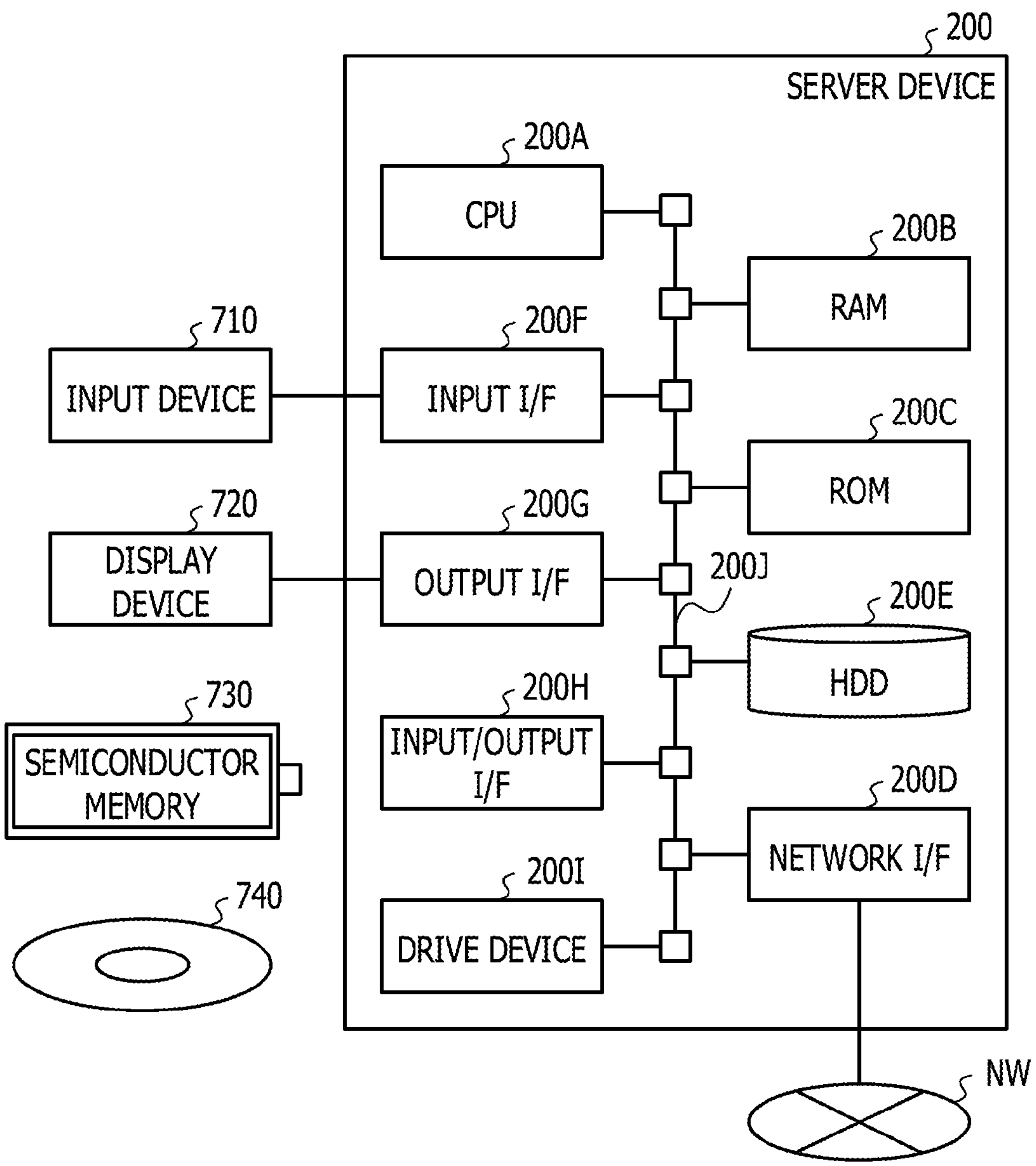
FIG. 2 is an example of a hardware configuration of a server device.

FIG. 2 is an example of the hardware configuration of the server device 200. As illustrated in FIG. 2, the server device 200 includes at least a central processing unit (CPU) 200A serving as a hardware processor, a random access memory (RAM) 200B, a read only memory (ROM) 200C, and a network interface (I/F) 200D. The server device 200 may include at least one of a hard disk drive (HDD) 200E, an input I/F 200F, an output I/F 200G, an input/output I/F 200H, and a drive device 200I, as necessary. The CPU 200A to the drive device 200I are mutually connected by an internal bus 200J. That is, the server device 200 may be implemented by a computer. Further, a micro processing unit (MPU) may be used as a hardware processor instead of the CPU 200A.

An input device 710 is connected to the input I/F 200F. The input device 710 includes, for example, a keyboard, a mouse, and the like. Further, the above-described input device 110 is also the same as the input device 710. A display device 720 is connected to the output I/F 200G. The display device 720 is, for example, a liquid crystal display. Further, the above-described display device 120 is also the same as the display device 720. A semiconductor memory 730 is connected to the input/output I/F 200H. The semiconductor memory 730 is, for example, a universal serial bus (USB) memory, a flash memory, or the like. The input/output I/F 200H reads a program or data stored in the semiconductor memory 730. The input I/F 200F and the input/output I/F 200H include, for example, a USB port. The output I/F 200G includes, for example, a display port.

A portable recording medium 740 is inserted into the drive device 200I. The portable recording medium 740 is, for example, a removable disc such as a compact disc (CD)-ROM or a digital versatile disc (DVD). The drive device 200I reads a program and data recorded on the portable recording medium 740. The network I/F 200D includes, for example, a LAN port, a communication circuit, and the like. The network I/F 200D is connected to the communication network NW described above.

The program stored in the ROM 200C or the HDD 200E is temporarily stored in the RAM 200B described above by the CPU 200A. The program recorded on the portable recording medium 740 is temporarily stored in the RAM 200B by the CPU 200A. When the stored program is executed by the CPU 200A, the CPU 200A implements various functions to be described later and executes various processes to be described later. Further, the program may be executed in accordance with the processing sequence diagram to be described later.

Next, the functions of the terminal device 100 and the server device 200 will be described with reference to FIGS. 3 and 4.

Figure 3:
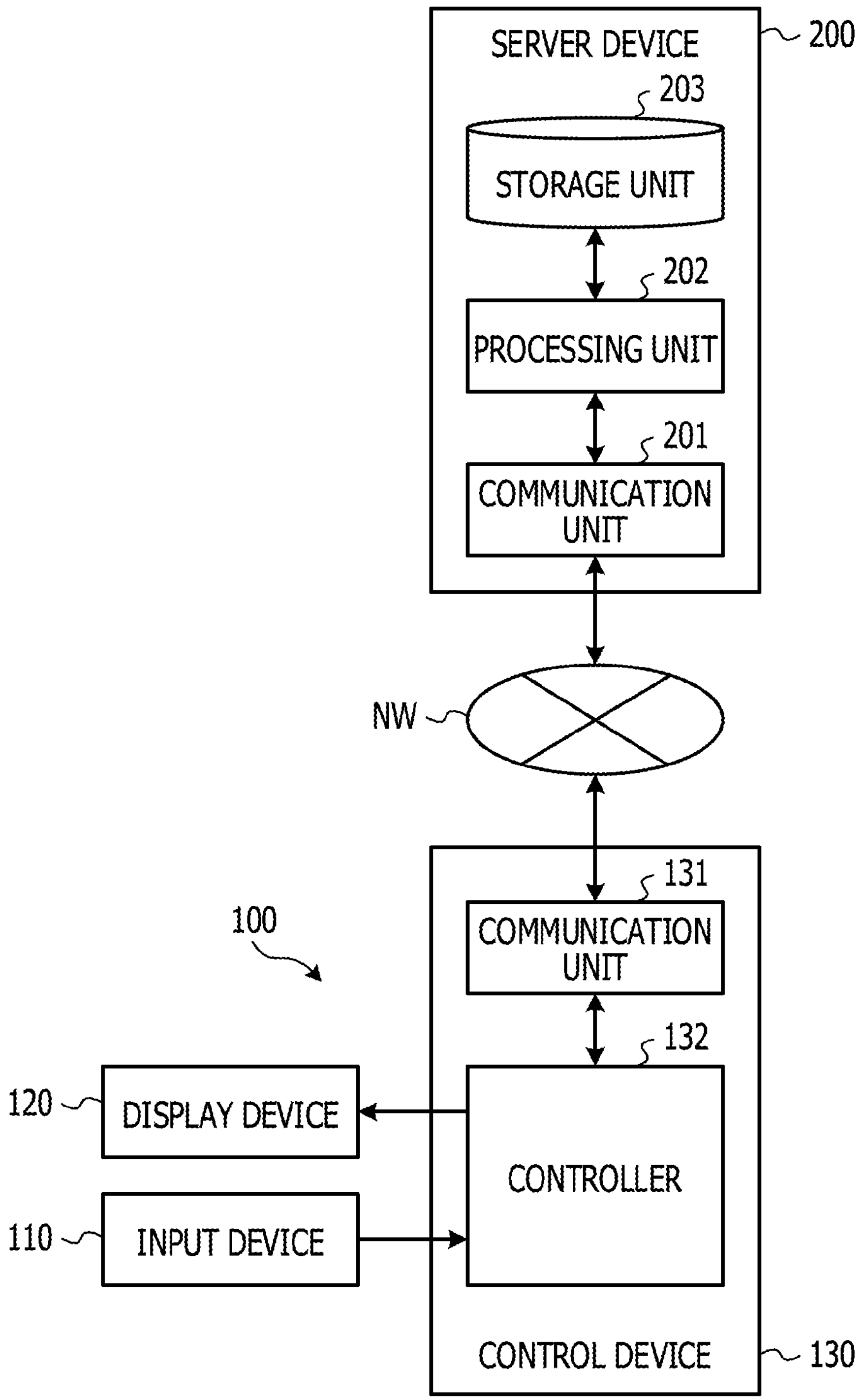
FIG. 3 is an example of a block diagram of a terminal device and a server device.
Figure 4:
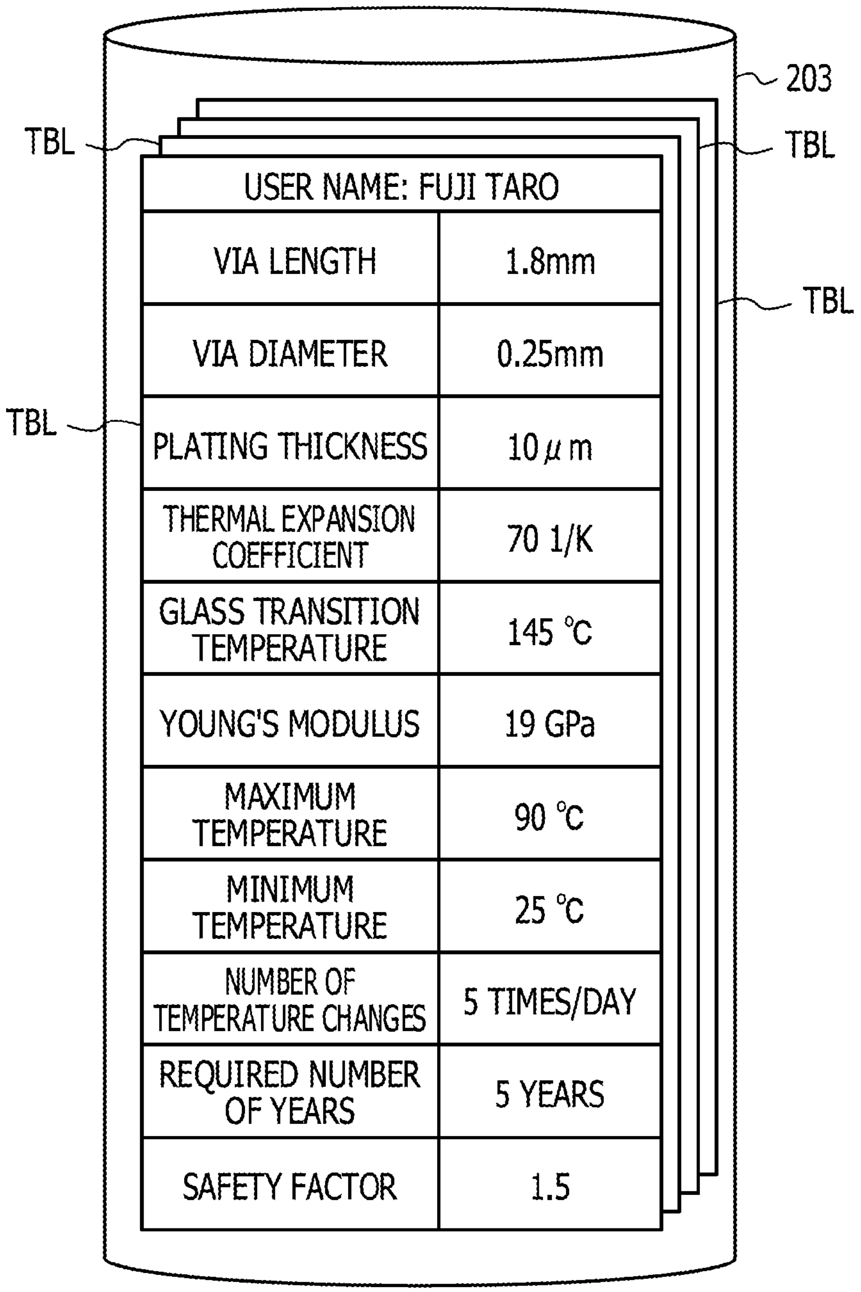
FIG. 4 is an example of a storage unit.

FIG. 3 is an example of a block diagram of the terminal device 100 and the server device 200. In particular, FIG. 3 illustrates a main part of the functional configuration of the control device 130 and the server device 200. FIG. 4 is an example of the storage unit 203.

First, the control device 130 will be described. The control device 130 includes a communication unit 131 and a controller 132, as illustrated in FIG. 3. The communication unit 131 may be implemented by, for example, the above-described network I/F 200D. The controller 132 may be implemented by, for example, the CPU 200A and the RAM 200B described above.

The communication unit 131 controls a communication between the control device 130 and the server device 200. For example, the communication unit 131 transmits the input information and the like output from the controller 132 to the server device 200. The communication unit 131 receives the first screen information, the output information, and the like transmitted from the server device 200 and outputs such information to the controller 132. Further, the first screen information is used to display various screens on the display device 120. The output information is used to cause the processing result of the server device 200 to be output to an output field in the screen displayed on the display device 120. Other information received by the communication unit 131 will be described later.

The controller 132 controls the operation of the terminal device 100. For example, the controller 132 receives input information from the input device 110. The input information includes, for example, an input value input to an input field in the screen, an instruction based on a screen operation, and the like. In addition, the controller 132 receives screen information output from the communication unit 131 and displays various screens according to the screen information on the display device 120. Further, the controller 132 receives the output information output from the communication unit 131, and outputs the processing result of the server device 200 to an output field in the screen displayed on the display device 120. The controller 132 also executes various processes.

Next, the server device 200 will be described. As illustrated in FIG. 3, the server device 200 includes a communication unit 201, a processing unit 202, and a storage unit 203. Further, the communication unit 201 may be implemented by, for example, the above-described network I/F 200D. The processing unit 202 may be implemented by, for example, the CPU 200A and the RAM 200B described above. The storage unit 203 may be implemented by, for example, the above-described HDD 200E.

The communication unit 201 controls the communication between the server device 200 and the control device 130. For example, the communication unit 201 transmits, to the control device 130, the first screen information, the output information, and the like output from the processing unit 202. The communication unit 201 receives input information and the like transmitted from the control device 130 and outputs such information to the processing unit 202.

The processing unit 202 receives input information output from the communication unit 201. Upon receiving the input information, the processing unit 202 calculates a distortion amount which represents the amount of distortion generated in the via based on the received input information and a predetermined specific equation. The processing unit 202 also corrects the calculated distortion amount. Further, the via may or may not penetrate the printed circuit board. That is, the via may be a through via which penetrates the printed circuit board, or may be an inner via (or a buried via) or a blind via which does not penetrate the printed circuit board. Further, the processing unit 202 calculates the lifetime of the via based on the received input information, the calculated distortion amount, and the predetermined specific equation, and performs a quality determination on the required lifetime of the calculated lifetime. The processing unit 202 outputs the calculated lifetime and the determination result of the quality determination to the communication unit 201. Thus, the communication unit 201 transmits output information including the lifetime and the determination result. Further, upon receiving the input information, the processing unit 202 may associate identification information which identifies a user (e.g., a name or the like) with the received input information and store such information in the storage unit 203 as a history. The processing unit 202 also executes various processes, but the details thereof will be described later.

The storage unit 203 stores input information. More specifically, as illustrated in FIG. 4, the input information is managed for each user by a management table TBL having a plurality of input fields. Here, a via length, a via diameter, and a plating thickness are stored in the input fields of the via length, the via diameter, and the plating thickness, respectively. That is, information on the specification of the printed circuit board is stored. The thermal expansion coefficient, a glass transition temperature, and the Young's modulus of a substrate of the printed circuit board are stored in the input fields of the thermal expansion coefficient, the glass transition temperature, and the Young's modulus, respectively. That is, information on the physical properties of the printed circuit board is stored. The maximum temperature, the minimum temperature, and the number of changes per day between the maximum temperature and the minimum temperature in the environment where the printed circuit board or the electronic device in which the electronic component is mounted on the printed circuit board is used, are stored in the input fields of the maximum temperature, the minimum temperature, and the number of temperature changes, respectively. That is, information on the environment where the printed circuit board or the electronic device is used is stored. The number of years for which a guarantee is required for the printed circuit board or the electronic device, and the safety factor are stored in the input fields of the required number of years and the safety factor, respectively. That is, information on conditions required for the printed circuit board or the electronic device is stored. When detecting a specific instruction of calling input information, the processing unit 202 described above acquires the input information from the storage unit 203 and outputs such information to the communication unit 201.

Further, the management table TBL may be provided with an input field that stores information affecting the lifetime of the via. The information that affects the lifetime of the via includes, for example, a first coefficient according to the arrangement of lands, a second coefficient according to the arrangement density of vias with respect to the printed circuit board, and a third coefficient according to the positional deviation between vias and lands. Further, the information that affects the lifetime of the via includes a fourth coefficient according to the size of the land, a fifth coefficient regarding the presence or absence of a solid layer, a sixth coefficient regarding the physical property value of a resin filling the via, and the like.

Subsequently, the operation of the information processing system ST will be described.

Figure 5:
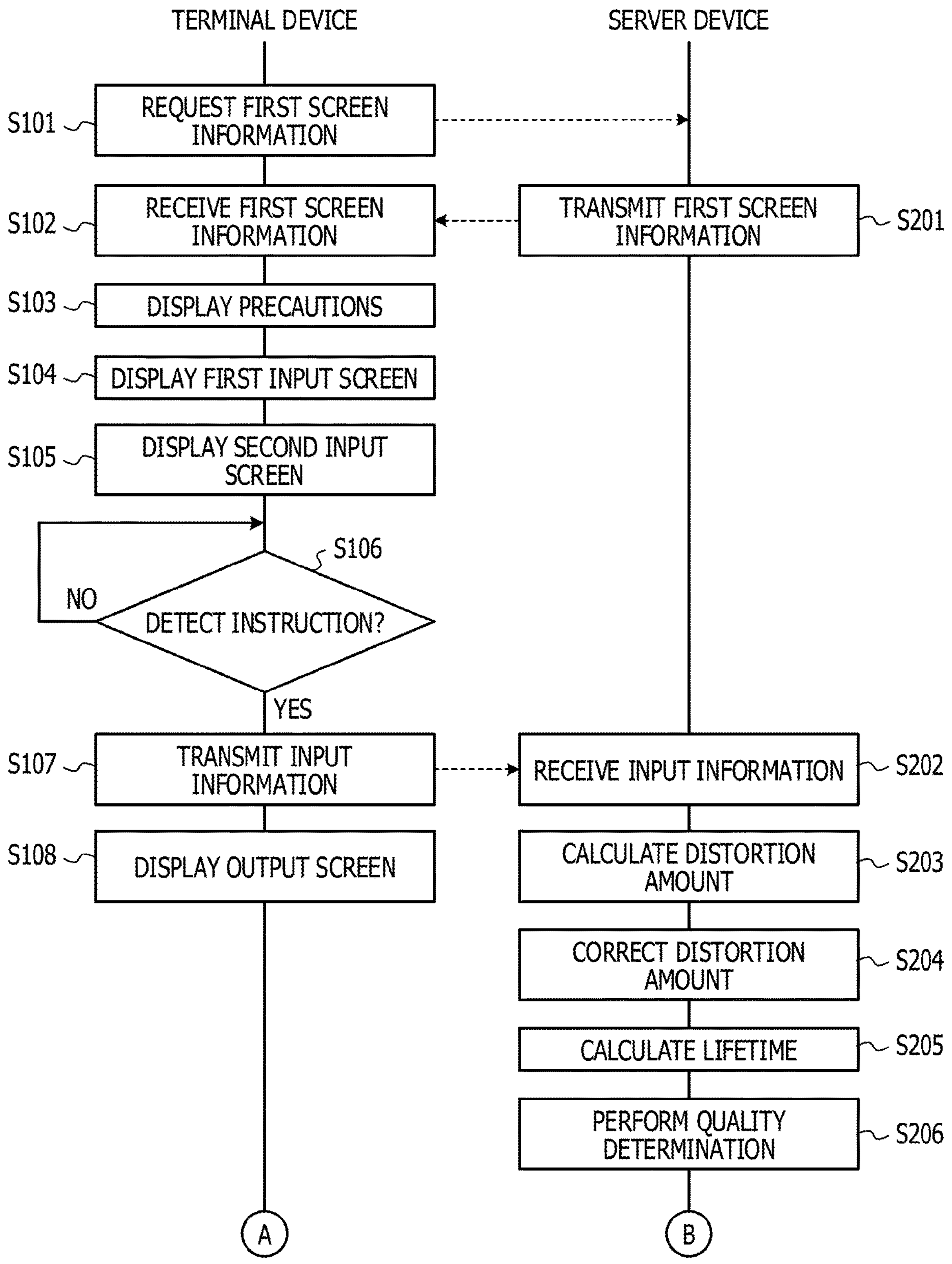
FIG. 5 is an example of a processing sequence diagram (part 1) of the information processing system.
Figure 6:
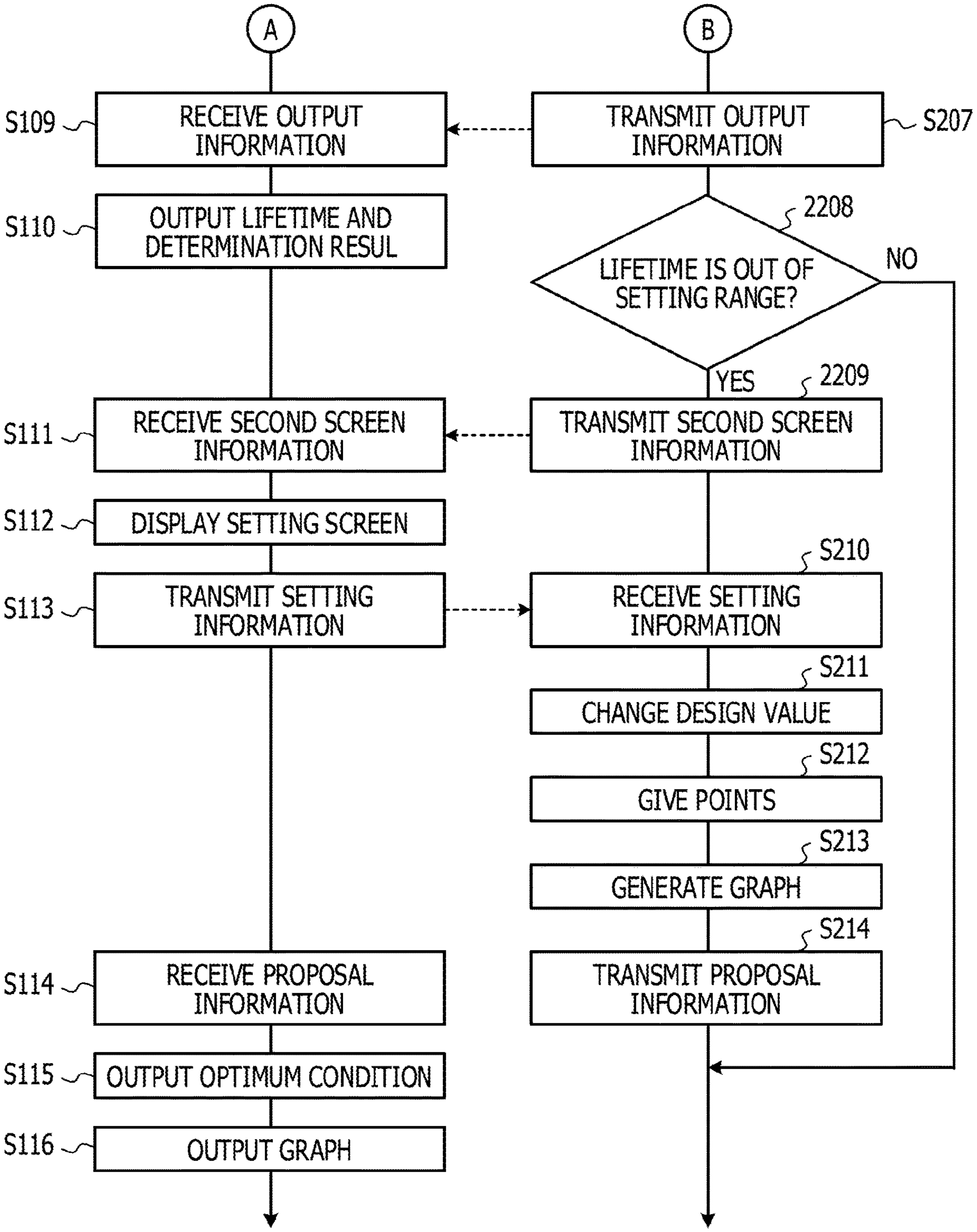
FIG. 6 is an example of a processing sequence diagram (part 2) of the information processing system.

FIG. 5 is an example of a processing sequence diagram (part 1) of the information processing system ST. FIG. 6 is an example of a processing sequence diagram (part 2) of the information processing system ST. The processing sequence diagram illustrated in FIG. 5 and the processing sequence diagram illustrated in FIG. 6 are continuous by the corresponding symbols "A" and "B."

First, the controller 132 of the terminal device 100 requests the server device 200 for the first screen information (step S101). More specifically, when the user operates the input device 110 and inputs an instruction that requests a screen of predicting the lifetime of the via, the controller 132 receives the instruction input to the input device 110. Upon receiving the instruction, the controller 132 requests that the server device 200 transmit the first screen information to the terminal device 100. When transmission of the first screen information is requested from the terminal device 100, the processing unit 202 of the server device 200 transmits the first screen information to the terminal device 100 via the communication unit 201 (step S201). As a result, the communication unit 131 of the terminal device 100 receives the first screen information (step S102).

When the communication unit 131 receives the first screen information, the controller 132 displays precautions on the display device 120 (step S103), and then displays a first input screen on the display device 120 (step S104). Also, the precautions are items that draw the user's attention when using a process of predicting the lifetime of the via. In addition, various pieces of information on the precautions, the first input screen, the second input screen to be described later, and an output screen are included in the first screen information.

The first input screen includes a plurality of input fields 11, 12, and 13 to which the specifications of the printed circuit board are input, and a plurality of input fields 21 and 23 to which the physical properties of the substrate of the printed circuit board are input, as illustrated in FIG. 7. In addition, the first input screen includes a plurality of input fields 31, 32, and 33 to which the use environment of the printed circuit board or the electronic device is input. Further, the first input screen includes a plurality of input fields 41 and 42 to which the number of years for which a guarantee is required for the printed circuit board or the electronic device and the safety factor are input. The input values input to the plurality of input fields 11, . . . , 33 are used as basic information to calculate the distortion amount of the via. In the meantime, the input values input to the plurality of input fields 41 and 42 are used as determination information to determine whether the lifetime of the via is good or bad. In particular, the safety factor input to the input field 42 as an input value may be appropriately selected by the user within the range of 1.0 to 2.0 because the requirements applied to the electronic device differ depending on the electronic device.

In addition, the first input screen includes a plurality of selection fields 10, 20, 30, and 40 that select an input method, and a plurality of operation buttons BT1, BT2, and BT3. The operation button BT1 is an operable image area which causes input information according to the user name to be called from the storage unit 203 and displayed in the corresponding plurality of input fields 11, . . . , 42. The operation button BT2 is an operable image area that causes the display device 120 to display a second input screen to be described later. The operation button BT3 is an operable image area that erases the numerical values displayed in the plurality of input fields 11, . . . , 42.

The user operates the input device 110 and performs an operation of inputting numerical values to the plurality of input fields 11, . . . , 42. The controller 132 acquires the numerical values input to the input device 110, and displays the numerical values in the input fields 11, . . . , 42. When ending an operation of inputting numerical values to the plurality of input fields 11, . . . , 42, the user operates the input device 110 and performs an operation of pressing the operation button BT2 (e.g., clicking, etc.). As a result, the controller 132 detects an instruction that displays the second input screen on the display device 120, and displays the second input screen on the display device 120, as illustrated in FIG. 5 (step S105). When the second input screen is displayed, the controller 132 stands by until an instruction of causing the server device 200 to execute the lifetime prediction of the via has been detected ("NO" in step S106).

Figure 8:
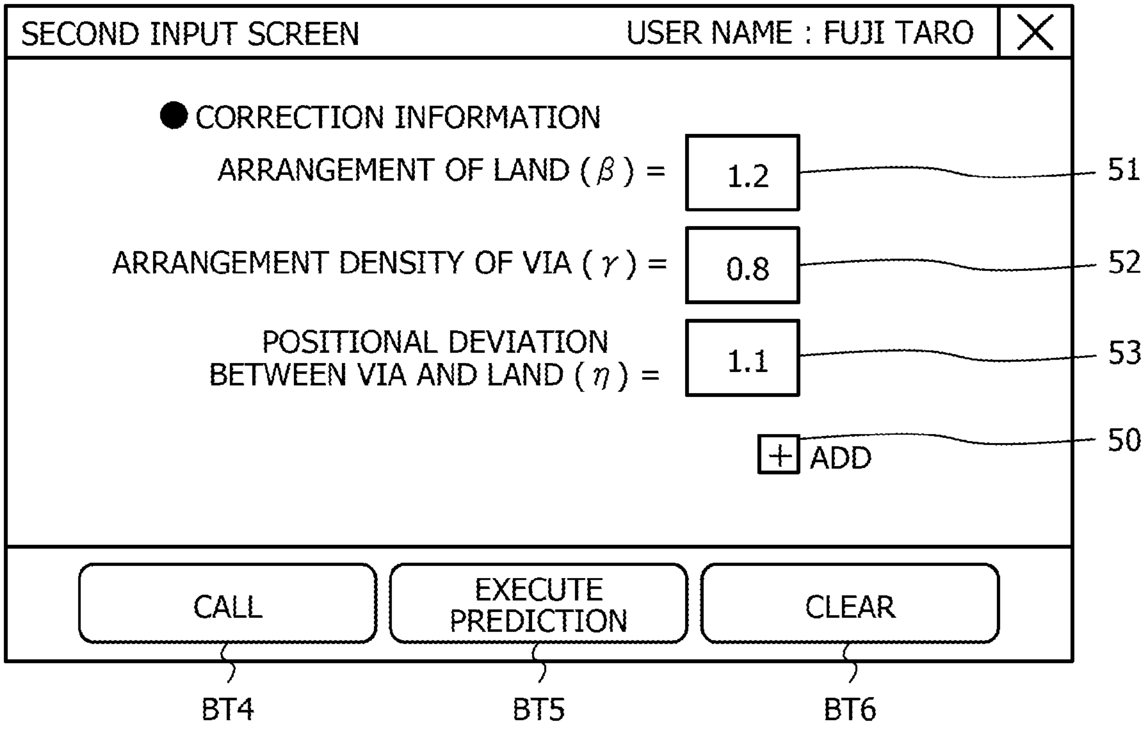
FIG. 8 is an example of a second input screen.

The second input screen includes an input field 51 to which the arrangement of lands is input, an input field 52 to which the arrangement density of vias is input, and an input field 53 to which the positional deviation between vias and lands is input, as illustrated in FIG. 8. In addition, the second input screen includes an addition button 50 used to add another input field different from the plurality of input fields 51, 52, and 53, and a plurality of operation buttons BT4, BT5, and BT6.

Here, the numerical values input to the plurality of input fields 51, 52, and 53 or another input field are used as correction information to correct the distortion amount of the via. The operation button BT4 is an operable image area that causes input information according to the user name to be called from the storage unit 203 and displayed in the corresponding plurality of input fields 51, 52, and 53, and the like. The operation button BT5 is an operable image area that causes the server device 200 to execute the lifetime prediction of the via. The operation button BT6 is an operable image area that erases the numerical values displayed in the plurality of input fields 51, 52, and 53, and the like.

Figure 9A:
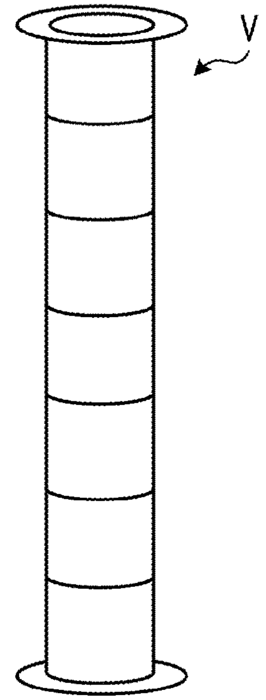
FIGS. 9A to 9D are diagrams for explaining an arrangement example of lands.
Figure 9B:
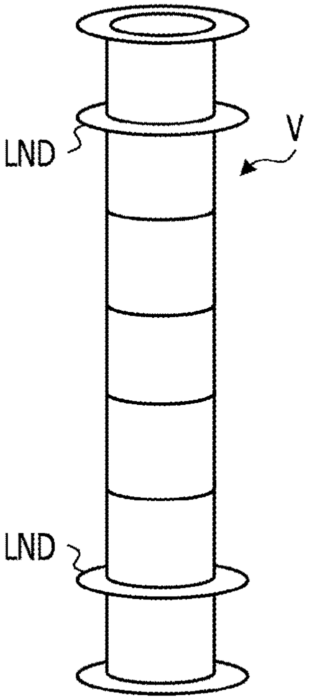
Figure 9C:
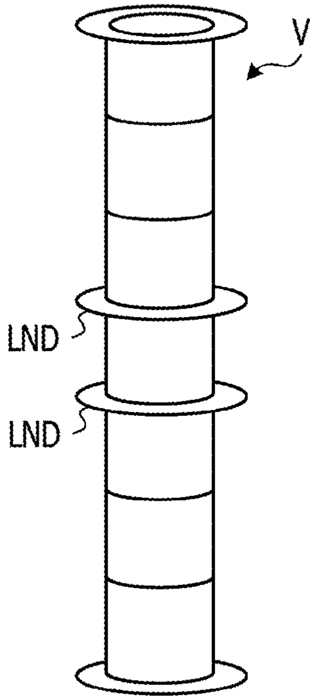
Figure 9D:
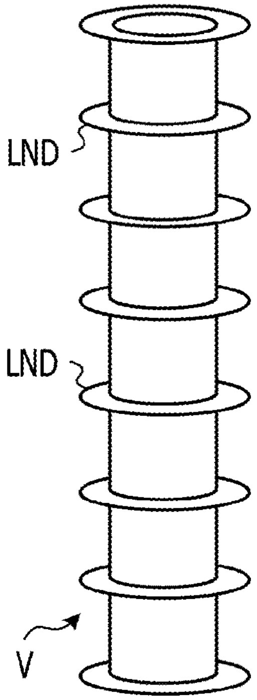

In particular, as illustrated in FIGS. 9A to 9D, the first coefficient β is input to the input field 51 according to the presence or absence and the arrangement of the land LND. For example, as illustrated in FIG. 9A, when the land LND is not disposed in an inner layer of the via V due to the structure of the via V, a numerical value of 1.0 is input to the input field 51 as the first coefficient β according to the user's operation. Similarly, as illustrated in FIG. 9B, when the land LND is disposed in a first layer of each of the vias V, a numerical value of 1.0 is input to the input field 51 as the first coefficient β according to the user's operation. As illustrated in FIG. 9C, due to the structure of the via V, when the land LND is disposed in a central layer which is a third layer of each of the vias V, a numerical value of 1.2 is input to the input field 51 as the first coefficient β according to the user's operation. As illustrated in FIG. 9D, due to the structure of the via V, when the land LND is disposed in all the layers of the via V, a numerical value of 1.6 is input to the input field 51 as the first coefficient β according to the user's operation. Further, the specific numerical value of the first coefficient β may be appropriately changed within the range where the accuracy of the lifetime may be improved.

Figure 10A:
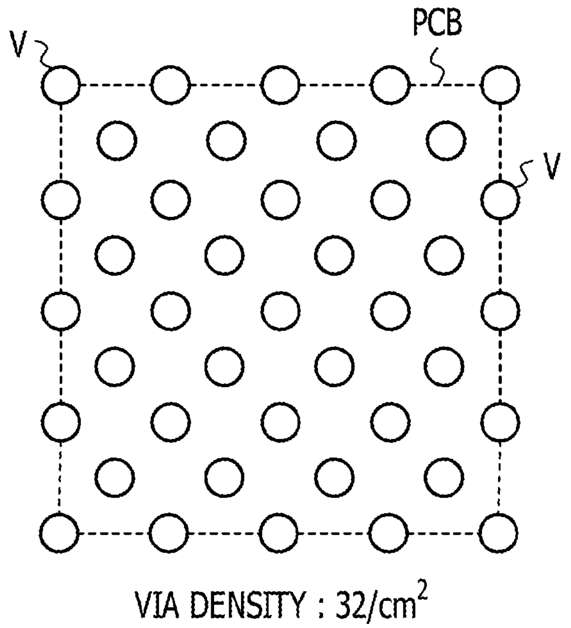
FIGS. 10A to 10D are diagrams for explaining an example of the arrangement density of vias.
Figure 10B:
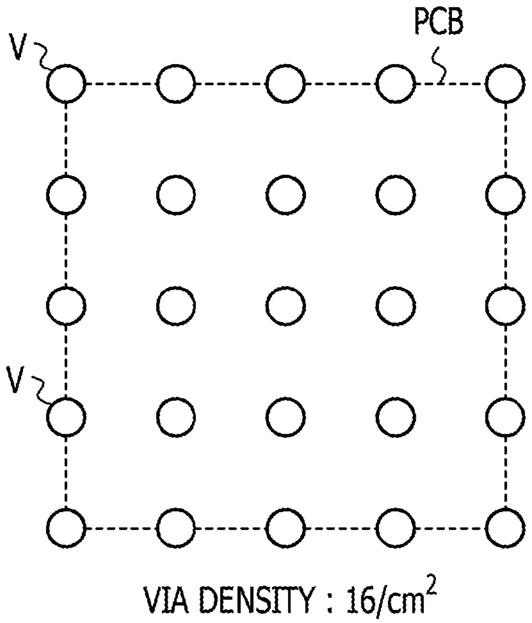
Figure 10C:
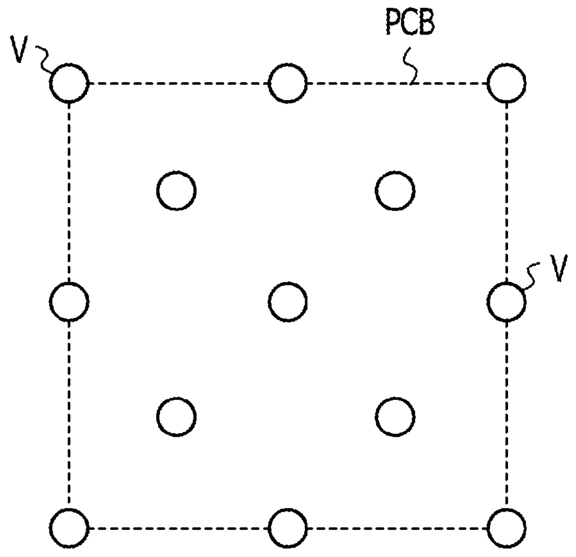
Figure 10D:
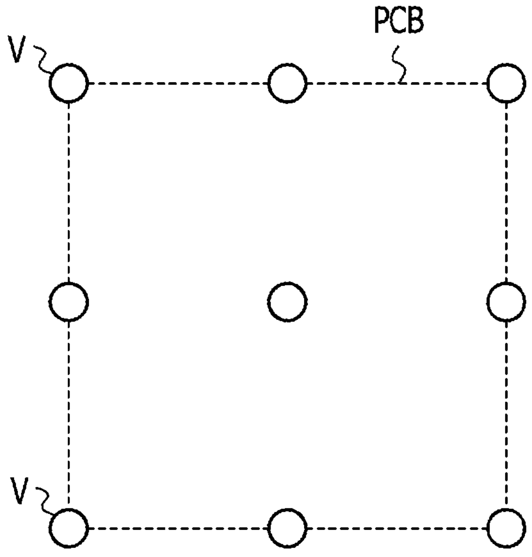

As illustrated in FIGS. 10A to 10D, a second coefficient γ is input to the input field 52 according to the arrangement density of the vias V with respect to a printed circuit board PCB. For example, as illustrated in FIG. 10A, due to the structure of the via V, when 32 vias V are arranged per 1 $cm^2$ of the printed circuit board PCB (a quarter circle×4+a semi-circle×12+a circle×25), a numerical value of 1.3 is input to the input field 52 as the second coefficient γ according to the user's operation. As illustrated in FIG. 10B, due to the structure of the via V, when 16 vias V are arranged per 1 $cm^2$ of the printed circuit board PCB (a quarter circle×4+a semi-circle×12+a circle×9), a numerical value of 1.0 is input to the input field 52 as the second coefficient γ according to the user's operation. As illustrated in FIG. 10C, due to the structure of the via V, when 8 vias V are arranged per 1 $cm^2$ of the printed circuit board PCB (a quarter circle×4+a semi-circle×4+a circle×5), a numerical value of 0.8 is input to the input field 52 as the second coefficient γ according to the user's operation. As illustrated in FIG. 10D, due to the structure of the via V, when 4 vias V are arranged per 1 $cm^2$ of the printed circuit board PCB (a quarter circle×4+a semi-circle×4+a circle×1), a numerical value of 0.7 is input to the input field 52 as the second coefficient γ according to the user's operation. Further, the specific numerical values of the second coefficient γ may be changed as appropriate within the range where the accuracy of the lifetime may be improved.

Figures 11A, 11B, 11C:
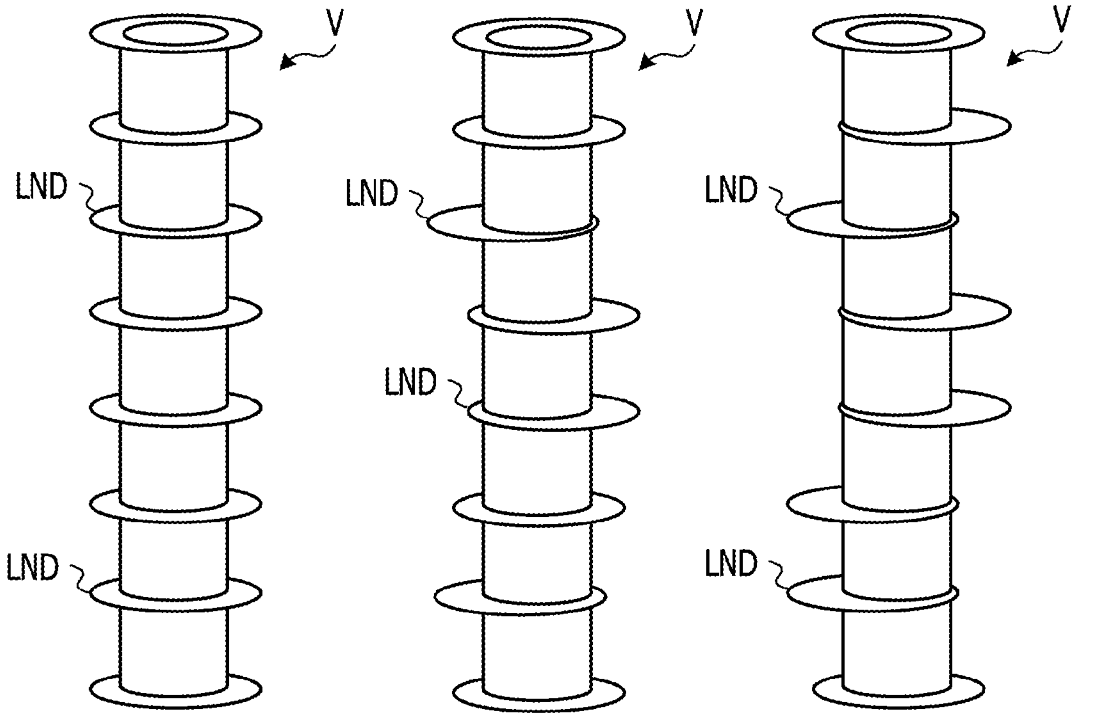
FIGS. 11A to 11C are diagrams for explaining an example of a positional deviation between vias and lands.

As illustrated in FIGS. 11A to 11C, a third coefficient η is input to the input field 53 according to the positional deviation between the via V and the land LND. For example, as illustrated in FIG. 11A, in the case of a rank A where the positional deviation between the via V and the land LND is 0 μm while the via V is processed, a numerical value of 1.0 is input to the input field 53 as the third coefficient η according to the user's operation. As illustrated in FIG. 11B, in the case of a rank B where the positional deviation between the via V and the land LND is more than 0 μm and not more than 100 μm while the via V is processed, a numerical value of 1.1 is input to the input field 53 as the third coefficient η according to the user's operation. As illustrated in FIG. 11C, in the case of a rank C where the positional deviation between the via V and the land LND is more than 100 μm while the via V is processed, a numerical value of 1.3 is input to the input field 53 as the third coefficient η according to the user's operation. Further, the specific numerical values of the third coefficient η may be changed as appropriate within the range where the accuracy of the lifetime may be improved.

In addition, although not illustrated, when the addition button 50 is pressed, at least one of a fourth coefficient according to the variation in the size of the land LND with respect to the via V, a fifth coefficient regarding the presence or absence of the solid layer, and a sixth coefficient regarding the physical property value of the resin filling the via V is input to another added input field.

The user operates the input device 110 and performs an operation of inputting numerical values to the plurality of input fields 51, 52, and 53 or another input field. The controller 132 acquires the numerical values input to the input device 110, and displays the numerical values in the input fields 51, 52, and 53. When ending an operation of inputting numerical values to the plurality of input fields 51, 52, and 53, the user operates the input device 110 and performs an operation of pressing the operation button BT5 (e.g., clicking, etc.). As a result, as illustrated in FIG. 5, the controller 132 detects an instruction of causing the server device 200 to execute the lifetime prediction of the via ("YES" in step S106), and the communication unit 131 transmits, to the server device 200, input information including the basic information, the determination information, and the correction information described above (step S107). When the communication unit 131 transmits the input information to the server device 200, the controller 132 displays an output screen on the display device 120 (step S108). Further, the controller 132 may display the output screen before transmitting the input information, or may display the output screen together with the transmission of the input information.

Figure 12:
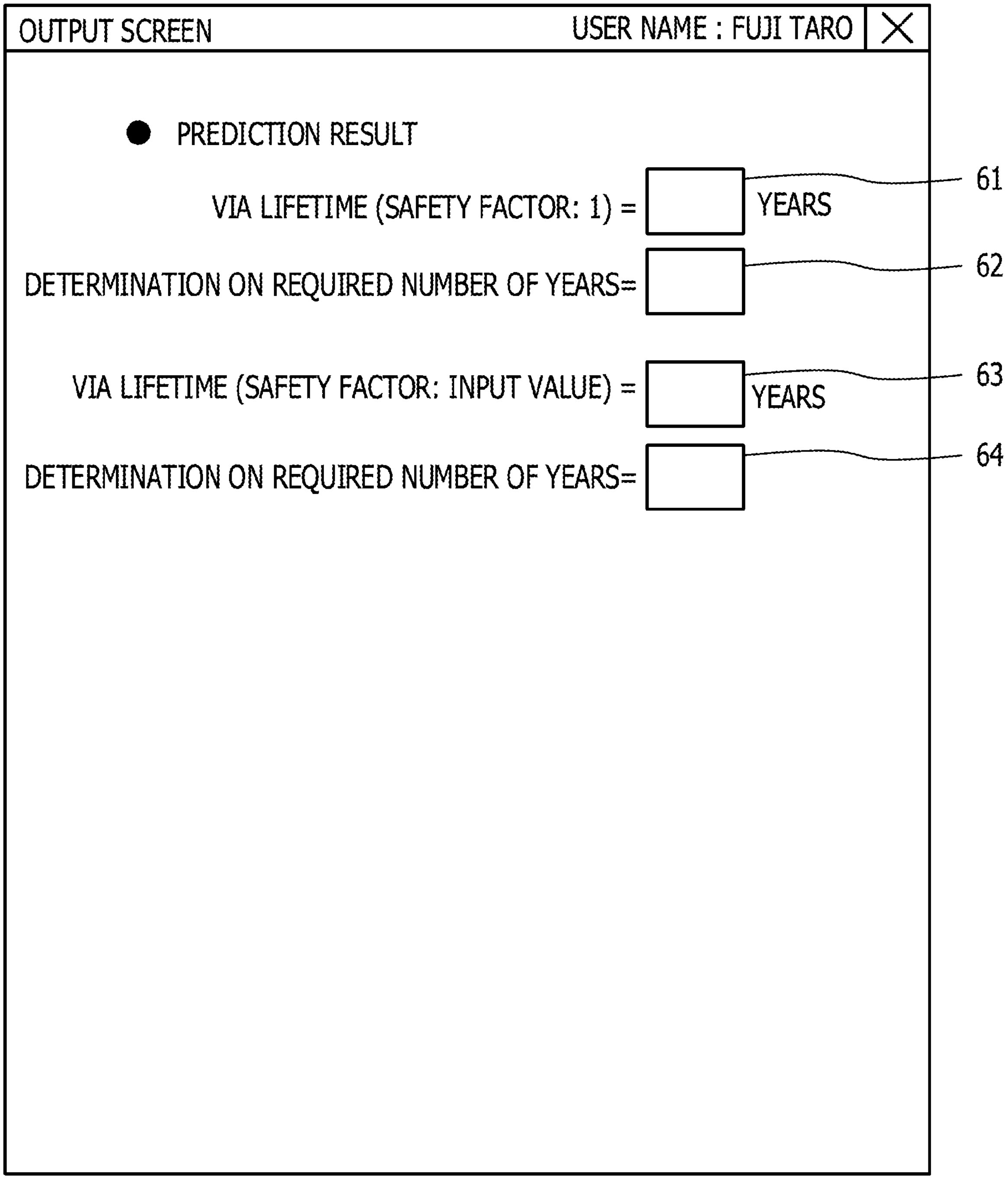
FIG. 12 is an example of an output screen that does not include output information.

The output screen includes a plurality of output fields 61, 62, 63, and 64 to which the prediction result is output, as illustrated in FIG. 12. In the output fields 61 and 63, the lifetime of the via V, which is the processing result by the server device 200, is output. In particular, the output field 61 outputs the lifetime when the safety factor is 1, and the output field 63 outputs the lifetime when the safety factor is a numerical value input on the first input screen. Meanwhile, the determination result of the quality determination by the server device 200 is output in both of the output fields 62 and 64. Further, the controller 132 displays an output screen in which all the output fields 61, 62, 63, and 64 are blank until the output information is received.

Referring back to FIG. 5, the communication unit 201 of the server device 200 receives the input information transmitted from the terminal device 100 (step S202). When the communication unit 201 receives the input information, the processing unit 202 calculates the distortion amount (step S203).

In particular, the processing unit 202 calculates the distortion amount based on the following equation (1) using a coefficient m obtained by stress calculation based on the theory of material dynamics and a stress simulation.

$$\Delta\varepsilon=\{(L\times\alpha\times\Delta t\times E)/(D\times T)\}\times m \quad (1)$$

Here, the symbol "Δε" represents a distortion amount. In particular, the symbol "Δε" represents the difference in distortion generated due to the temperature change (the difference between the distortion at maximum temperature ($t_{max}$) and the distortion at minimum temperature ($t_{min}$)). The symbol "L" represents the length of the via V. The symbol "α" represents a thermal expansion coefficient of the substrate of the printed circuit board PCB. The symbol "Δt" represents a temperature change of the environment in which the printed circuit board PCB or the electronic device is used. In particular, the symbol "Δt" may be represented by the difference between the maximum temperature and the minimum temperature input on the first input screen. The symbol "E" represents the Young's modulus of the substrate of the printed circuit board PCB. The symbol "D" represents the diameter of the via V. The symbol "T" represents the plating thickness in the via V.

The length of the via V, the thermal expansion coefficient, the maximum temperature, the minimum temperature, the Young's modulus, the diameter of the via V, and the plating thickness described above are all included in the basic information of the input information. Therefore, when the coefficient m is defined in advance, the processing unit 202 may calculate the distortion amount. For example, when the coefficient m is defined within the range of 0.75×10-4 to 1.5×10-4, the distortion amount may be calculated with high accuracy. Further, when the coefficient m is defined to 1.4×10-4, the distortion amount may be calculated with higher accuracy.

In the process of step S203, when the distortion amount is calculated, the processing unit 202 then corrects the distortion amount (step S204).

In particular, the processing unit 202 corrects the distortion amount based on the following equation (2).

$$\Delta\varepsilon'=\Delta\varepsilon\times\beta\times\gamma\times\eta \quad (2)$$

Here, β is a first coefficient according to the arrangement of the lands LND. γ is a second coefficient according to the arrangement density of the vias V with respect to the printed circuit board PCB. η is a third coefficient according to the positional deviation between the via V and the land LND. The equation (2) may be further multiplied by at least one of the fourth to sixth coefficients described above. Also, one or two of the first to third coefficients may be subtracted from the equation (2). The processing unit 202 may not necessarily execute the process of step S204, but it is possible to improve the calculation accuracy of the lifetime of the via V by performing the process of step S204. Further, the first to third coefficients are all included in the correction information of the input information. Meanwhile, the fourth to sixth coefficients may or may not be included in the correction information of the input information.

In the process of step S204, when the distortion amount is corrected, the processing unit 202 then calculates the lifetime (step S205).

In particular, the processing unit 202 calculates the lifetime based on the equation (3).

$$M=N/(n\times 365) \quad (3)$$

Here, the symbol "M" represents the lifetime of the via V. The symbol "N" represents the number of cycles of the lifetime which satisfies the equation (4) according to the Coffin-Manson rule described below. The symbol "n" represents the number of temperature changes.

$$N^x=C/\Delta\varepsilon \quad (4)$$

Here, the symbol "x" represents the fatigue ductility index of the material used for plating. The symbol "C" represents the fatigue ductility coefficient of the material used for plating. The symbol "Δε" represents a distortion amount after correction. That is, in the equation (4), the symbol "Δε" corresponds to the symbol "Δε'."

The number of temperature changes described above is included in the basic information of the input information. Therefore, when the fatigue ductility index and the fatigue ductility coefficient are defined in advance, the processing unit 202 may calculate the lifetime. In addition, as for the fatigue ductility index and the fatigue ductility coefficient, it is desirable to use values which are obtained from the experiments of the fracture strength of copper.

In the process of step S205, when the lifetime is calculated, the processing unit 202 then performs the quality determination (step S206). More specifically, the processing unit 202 performs a quality determination based on the definition of the optimum range of the lifetime described below.

<Definition of Optimum Range of Lifetime>

Required number of years≤(calculated lifetime/safety factor)≤required number of years×predetermined value That is, the processing unit 202 compares the value obtained by dividing the lifetime calculated in the process of step S205 by the safety factor with the lower limit value and the upper limit value of the required number of years set as the number of years for which the guarantee is required so as to perform a determination as to whether the value obtained by dividing the calculated lifetime of the via V by the safety factor falls within the range of the lower limit value and the upper limit value of the required number of years. The required number of years and the safety factor are included in the determination information of the input information as described above. Further, as for the predetermined value, a numerical value according to the user who uses a product such as a printed circuit board PCB or an electronic device (e.g., "2," "10," or the like) may be used.

For example, when the value obtained by dividing the lifetime calculated in the process of step S205 by the safety factor is included in the range of the lower limit value and the upper limit value of the required number of years, the processing unit 202 determines that the calculated lifetime of the via V satisfies the required number of years. Conversely, when the value obtained by dividing the lifetime calculated in the process of step S205 by the safety factor is not included in the range of the lower limit value and the upper limit value of the required number of years, it is determined that the calculated lifetime of the via V does not satisfy the required number of years. The processing unit 202 calculates the lifetime when the safety factor is 1 and the lifetime when the safety factor is a numerical value input on the first input screen, respectively, and performs a quality determination thereon.

In the process of step S206, when the processing unit 202 performs the quality determination, the communication unit 201 transmits output information (step S207) as illustrated in FIG. 6. More specifically, the processing unit 202 combines the calculated lifetime with the determination result of the quality determination for each safety factor, and outputs such a combination to the communication unit 201. The communication unit 201 then outputs information including the lifetime and the determination result for each safety factor. In other words, the processing unit 202 outputs the output information to the terminal device 100 via the communication unit 201. Further, in the present embodiment, a character string such as "OK" or "NG" is used as the determination result, but a symbol such as "○" or "x" may be used as well.

Figure 13:
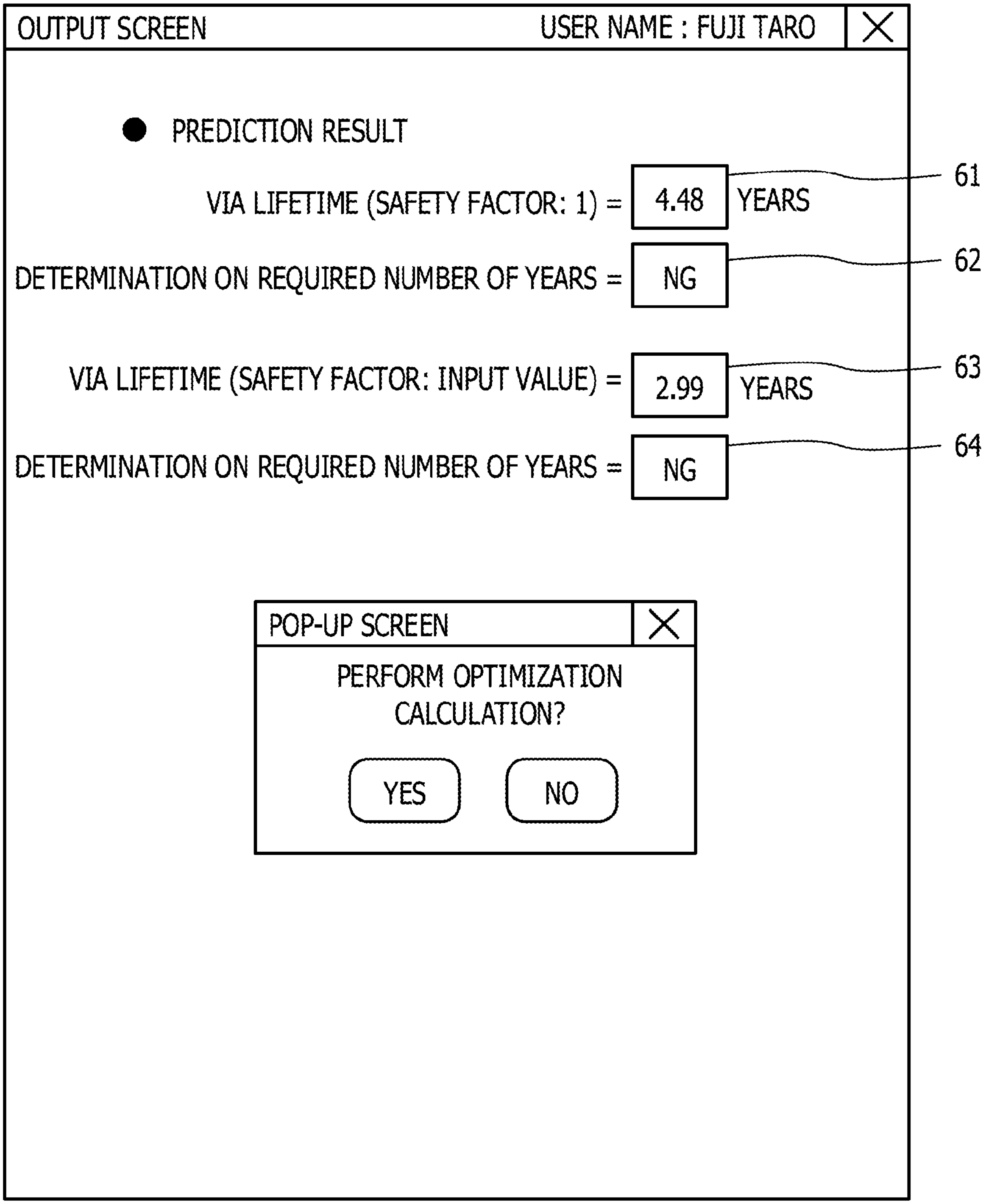
FIG. 13 is an example of an output screen including the output information and a pop-up screen.

The communication unit 131 of the terminal device 100 receives the output information transmitted from the server device 200 (step S109). When the communication unit 131 receives the output information, the controller 132 outputs the lifetime and the determination result (step S110). Specifically, the controller 132 outputs the lifetime and the determination result in consideration of the safety factor to the output fields 61, 62, 63, and 64 of the output screen for each safety factor. As a result, as illustrated in FIG. 13, the lifetime of the via V when the safety factor is 1 is output to the output field 61, and the determination result for the required number of years is output to the output field 62. Similarly, the lifetime of the via V when the safety factor is the input value is output to the output field 63, and the determination result for the required number of years is output to the output field 64. In the present embodiment, because five years are input as the required number of years on the first input screen (see, e.g., FIG. 7), FIG. 13 represents that the lifetime considering the safety factor does not satisfy the required number of years for any safety factor.

Further, in the process of step S207, when the communication unit 201 transmits the output information, the processing unit 202 determines whether the lifetime is out of the setting range (step S208). More specifically, the processing unit 202 confirms whether the value obtained by dividing the lifetime calculated in the process of step S205 by the safety factor falls within the range of the lower limit value and the upper limit value of the required number of years defined by the definition of the optimum range described above. In any safety factor, when the value obtained by dividing the lifetime by the safety factor falls within the range of the lower limit value and the upper limit value of the required number of years, the processing unit 202 determines that the lifetime falls within the setting range ("NO" in step S208) and ends the process without executing the subsequent process. That is, the result which satisfies the definition of the optimum range of the lifetime described above has been obtained.

In the meantime, when the value obtained by dividing the lifetime by the safety factor does not fall within the range of the lower limit value and the upper limit value of the required number of years for one or both of the safety factors, the processing unit 202 determines that the lifetime is out of the setting range ("YES" in step S208), and transmits the second screen information to the terminal device 100 via the communication unit 201 (step S209). As a result, the communication unit 131 of the terminal device 100 receives the second screen information (step S111).

Figure 14:
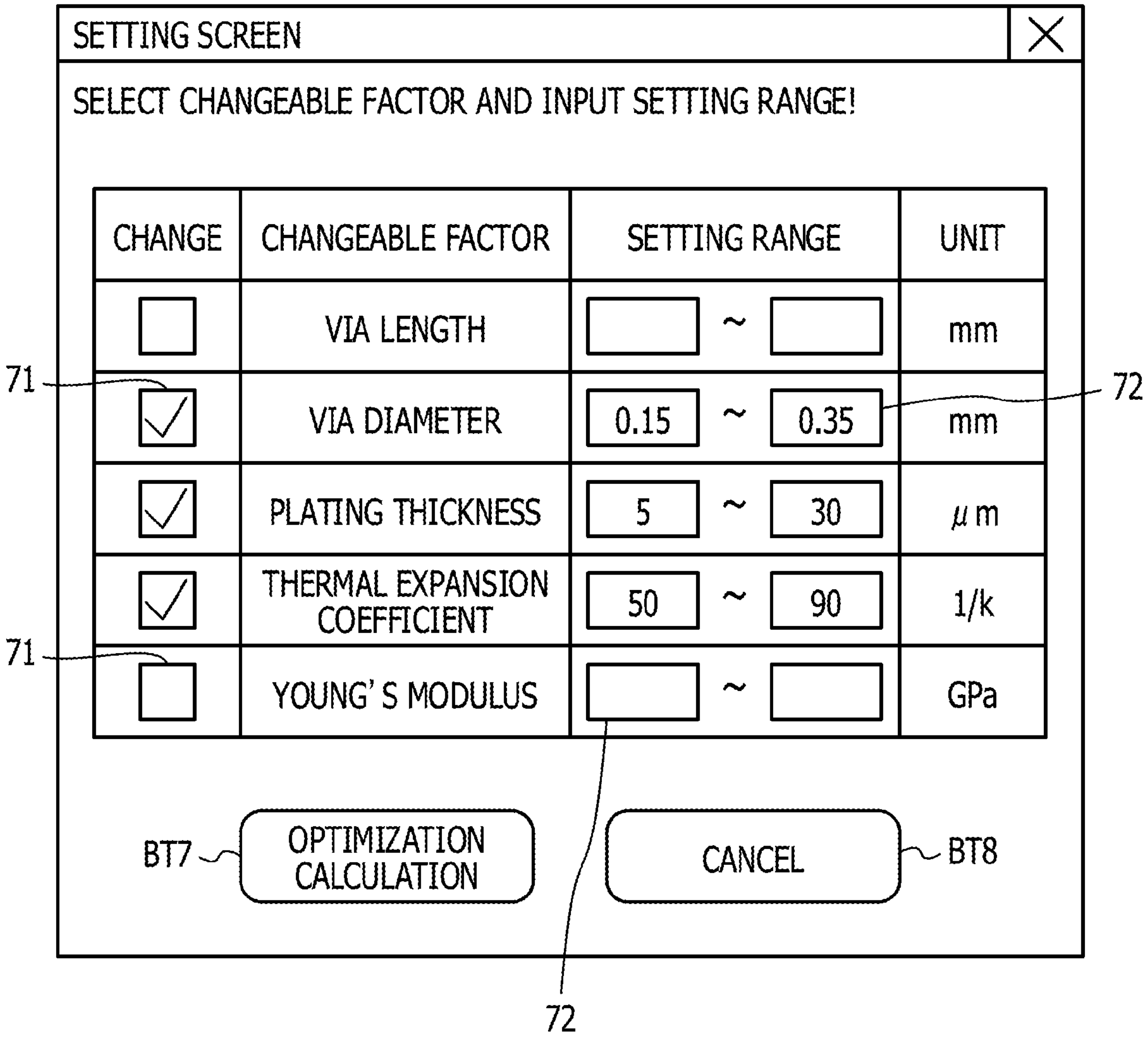
FIG. 14 is an example of a setting screen.

When the communication unit 131 receives the second screen information, the controller 132 displays a setting screen on the display device 120 (step S112). More specifically, the controller 132 displays a pop-up screen on the display device 120, as illustrated in FIG. 13, and displays a setting screen when a positive instruction (e.g., "YES") is detected, as illustrated in FIG. 14. Further, various information on the pop-up screen and the setting screen is included in the second screen information.

As illustrated in FIG. 14, the setting screen includes a plurality of selection fields 71 in which changeable factors are selected, and a plurality of input fields 72 to which setting ranges are input. Regarding changeable factors selected in the plurality of selection fields 71, the input value input to the input field 72 corresponding to the changeable factors is used as setting information when calculating the lifetime of the via again. In addition, the setting screen includes a plurality of operation buttons BT7 and BT8. The operation button BT7 is an operable image area that instructs starting an optimization calculation. The operation button BT8 is an operable image area that erases a check symbol or a numerical value displayed in the plurality of selection fields 71 and the plurality of input fields 72.

The user operates the input device 110 and performs an operation of inputting a check symbol in at least one of the plurality of selection fields 71. In addition, the user operates the input device 110 and performs an operation of inputting a numerical value so as to specify the setting range in the input field 72 corresponding to the selection field 71 in which the check symbol is input. When inputting a check symbol to the selection field 71 and ending an operation of inputting a numerical value to the input field 72, the user operates the input device 110 and performs an operation of pressing the operation button BT7 (e.g., clicking, etc.). As a result, as illustrated in FIG. 6, the controller 132 transmits the setting information to the server device 200 via the communication unit 131 (step S113). The setting information transmitted by the controller 132 includes a changeable factor corresponding to the selection field 71 in which the check symbol is input and a numerical value specifying the setting range. Thus, the communication unit 201 of the server device 200 receives the setting information (step S210).

When the process of step S210 is completed, the processing unit 202 changes the design value (step S211). More specifically, the processing unit 202 specifies the initial design value input on the first input screen based on the changeable factor included in the setting information received by the communication unit 201. In the present embodiment, as illustrated in FIG. 14, since the via diameter, the plating thickness, and the thermal expansion coefficient are selected as changeable factors, the processing unit 202 specifies the initial design values of the via diameter, the plating thickness, and the thermal expansion coefficient input on the first input screen, respectively. Then, the processing unit 202 changes the initial design values to a plurality of design values based on the numerical value specifying the setting range included in the setting information and the unique pitch width defined in association with the changeable factor, for the specified initial design values.

Thus, for example, when the via diameter is one of the design values to be changed, the processing unit 202 changes the via diameter from the initial design value of 0.25 mm to two design values of 0.2 mm and 0.3 mm, as illustrated in FIG. 15. Furthermore, two design values of 0.2 mm and 0.3 mm, which are design values after the change, are changed to two design values of 0.15 mm and 0.35 mm, respectively. That is, the processing unit 202 changes the initial design value and the changed design value to a pitch width of 0.05 mm. Further, in the present embodiment, 0.25 mm, which is the initial design value of the via diameter, is also included as the changed design value. The processing unit 202 changes the initial design values to a plurality of design values as in the case of the plating thickness and the thermal expansion coefficient as well as the via diameter, but FIG. 15 omits a part of the changed design values.

Here, as for the pitch width, different values are adopted for each changeable factor for technical reasons. For example, in the case of the via diameter, 0.05 mm is adopted as the pitch width. The reason for this is that the diameter of a drill which processes a hole is generally manufactured in the unit of 0.05 mm, and the pitch width is determined based on the diameter of the drill. In the case of the plating thickness, 1 μm is adopted as the pitch width. The reason for this is that it is desirable to calculate a target value which may minimize the plating thickness for every 1 μm. In the case of the thermal expansion coefficient, every 1 Kelvin (1/K) is adopted as the pitch width. The reason for this is that the initial design value of the thermal expansion coefficient is chopped every 1 Kelvin to obtain the value of the physical property that satisfies the required number of years, and the material is specified according to the obtained value. Further, in the case of the via length, 0.1 mm is adopted as the pitch width. The reason for this is that there is a variation in the manufacture of the substrate, and it is difficult to manage the substrate of 0.1 mm or less. In addition, in the case of the Young's modulus, 1 GPa is adopted as the pitch width. The reason for this is that the initial design value of the Young's modulus is chopped every 1 GPa to obtain the value of the physical property that satisfies the required number of years, and the material is specified according to the obtained value.

When the process of step S211 is completed, the processing unit 202 allocates a point, as illustrated in FIG. 6 (step S212). More specifically, the processing unit 202 allocates a point to each of the changed design values based on the cost allocation point table illustrated in FIG. 16 and the miniaturized allocation point table illustrated in FIG. 17. Further, when such a cost allocation point table and a miniaturized allocation point table are stored in the storage unit 203, the processing unit 202 may access the storage unit 203 and allocate a point to each of the changed design values.

Therefore, for example, when the changed design value of the via diameter is 0.15 mm, since −2 points are allocated based on the cost allocation point table represented in FIG. 16, −2 points are given as the cost point as represented in FIG. 15. That is, when the initial design value of the via diameter is changed to a design value smaller than the initial design value, an adverse effect may occur that various costs such as product cost and manufacturing cost increase. Meanwhile, when the via diameter is 0.15 mm, which is the changed design value of the via diameter, since +1 point is allocated based on the miniaturized allocation point table represented in FIG. 17, 1 point is given as the miniaturization point as represented in FIG. 15. That is, when the initial design value of the via diameter is changed to a design value smaller than the initial design value, there is a possibility that the high density may be obtained in terms of miniaturization. The processing unit 202 performs such a point allocation on all of the changed design values. As a result, as illustrated in FIG. 15, various points according to the cost allocation point table and the miniaturization allocation point table are given to various design values after the change.

When the process of step S212 is completed, the processing unit 202 generates a graph (step S213) as illustrated in FIG. 6. More specifically, the processing unit 202 calculates the lifetime, the total cost point, the total miniaturization point, and the total of two total points for each combination of the three changed design values (respective design values of the via diameter, the plating thickness, and the thermal expansion coefficient), and generates a graph based on the calculation result.

Here, as represented in FIG. 15, when various points are given to various design values after the change, the processing unit 202 may calculate the lifetime based on each design value after the change and a part of the initial design values and the safety factor which are not changed, as represented in FIG. 18. FIG. 18 illustrates the lifetime in consideration of the safety factor, and FIG. 15 and FIG. 18 correspond to each other by the symbols “P” and “Q.” When the lifetime in consideration of the safety factor is calculated, the processing unit 202 specifies pass or fail according to the lower limit value and the upper limit value of the required number of years. For example, when “2” is used as a predetermined value of an element that determines the upper limit value of the required number of years, the optimum range of the lifetime considering the safety factor is 5 years or more and 10 years or less. Therefore, the lifetime of less than 5 years is short of the required number of years, and the lifetime of more than 10 years has excessive quality. For this reason, “NG” that represents failure is given to these lifetimes in FIG. 18.

Further, the processing unit 202 sums the points given to the three types of design values from each viewpoint of cost and miniaturization, and calculates a total cost point and a total miniaturization point. The processing unit 202 also calculates a total which represents the sum of the total cost point and the total miniaturization point. As a result, as represented in FIG. 18, it is possible to quantitatively specify the lifetime, the total cost point, the total miniaturization point, and the total for the combination of various design values after the change. In particular, a combination of design values having the highest total cost point is the best combination in terms of cost. Meanwhile, a combination of design values having the highest total miniaturization point is the best combination in terms of miniaturization. In addition, it is desirable to specify the best combination in terms of miniaturization based on the lifetime length or the total, when the total miniaturization point is the same point.

Further, when calculating all of the lifetime, the total cost point, the total miniaturization point, and the total, the processing unit 202 extracts a combination of the design values to which “OK” indicating pass is given for the lifetime, the lifetime corresponding to the combination, the total cost point, the total miniaturization point, and the total. That is, as illustrated in FIG. 19, the processing unit 202 extracts a part of the combinations among the combinations of the changed design values illustrated in FIG. 15. Then, as illustrated in FIG. 20, the processing unit 202 extracts the lifetime, the total cost point, the total miniaturization point, and the total corresponding to the extracted part of the combinations among the lifetime, the total cost point, the total miniaturization point, and the total as illustrated in FIG. 18 corresponding to the combination illustrated in FIG. 15. Also, FIG. 19 and FIG. 20 correspond to each other by the symbols “X” and “Y.” In this way, it is possible to specify combinations of design values that satisfy the definition of the optimum range. The processing unit 202 generates a graph based on the extracted lifetime, total cost point, total miniaturization point, and total as illustrated in FIG. 20.

When the process of step S213 is completed, as illustrated in FIG. 6, the processing unit 202 transmits proposal information to the terminal device 100 via the communication unit 201 (step S214). In other words, the processing unit 202 outputs the proposal information to the terminal device 100 via the communication unit 201. As a result, the communication unit 131 of the terminal device 100 receives the proposal information (step S114). Further, the proposal information includes the optimum condition that represents the combination of the design values having the highest total cost point and the lifetime in the combination, and the combination of the design values having the highest total miniaturization point and the lifetime in the combination. Further, the proposal information includes various types of information on the graph generated by the processing unit 202.

Figure 22:
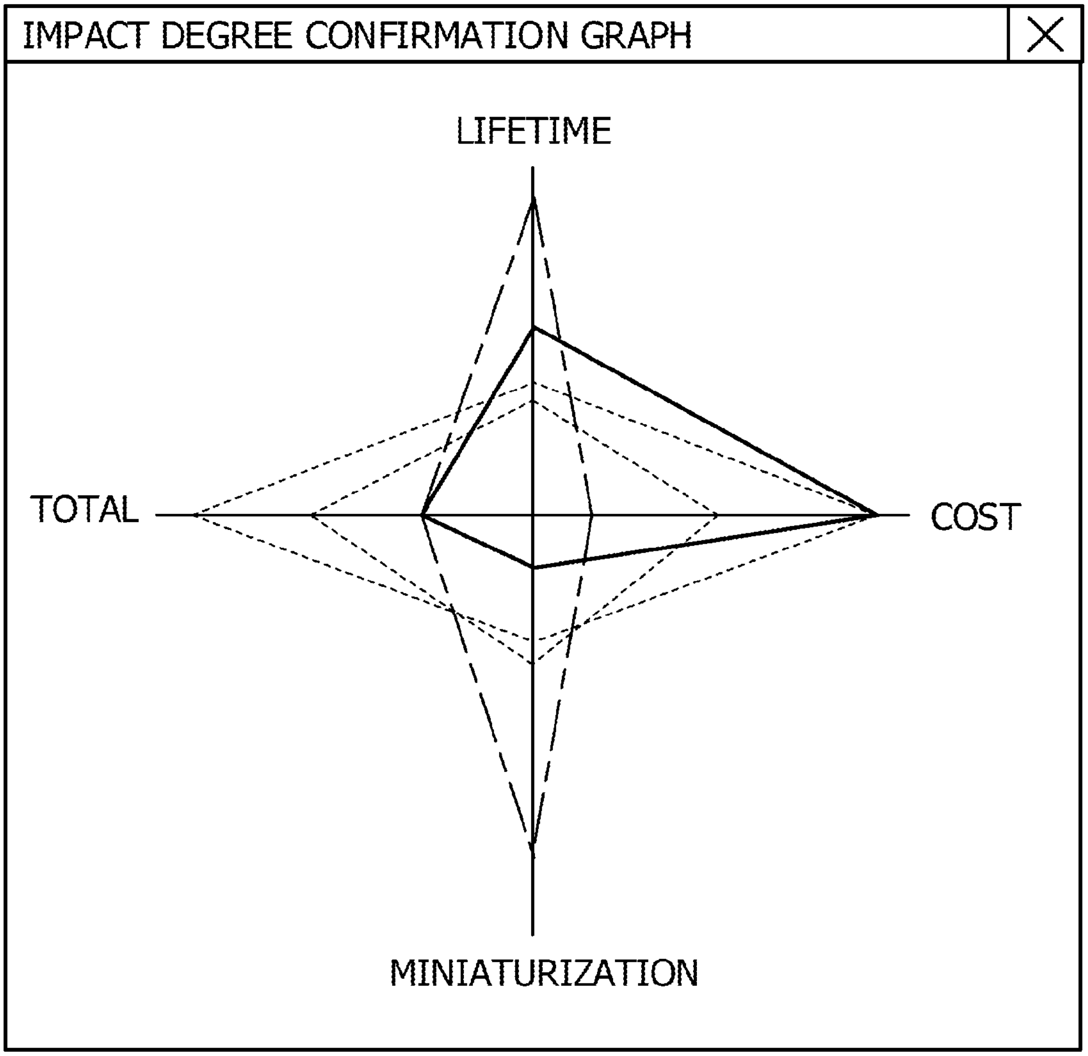
FIG. 22 is an example of an impact degree confirmation graph.

When the communication unit 131 receives the proposal information, the controller 132 outputs the optimum condition (step S115). More specifically, the controller 132 outputs the optimum condition and the operation button below the output field 64 of the output screen. The operation button output below the output field 64 is an operable image area in which a graph is displayed. As a result, as illustrated in FIG. 21, an optimum condition 80 and an operation button BT9 appear below the output field 64. Further, when the process of step S115 is completed, as illustrated in FIG. 6, the controller 132 outputs a graph (step S116). More specifically, the user operates the input device 110 and performs an operation of pressing the operation button BT9. Thus, the controller 132 detects an instruction of displaying the graph on the display device 120, and displays the graph on the display device 120, as illustrated in FIG. 22, based on the information on the graph included in the proposal information. That is, the processing unit 202 may indirectly output the graph to the display device 120 via the communication unit 201 and the control device 130. In the present embodiment, a radar chart is used as an example of the graph, but the present disclosure is not limited to the radar chart and may be a bar graph, a line graph, or the like. Since there are a plurality of combinations of design values capable of calculating the lifetime which satisfies the optimum range, a plurality of graphs corresponding to the combination of design values appear on the display device 120. Since the impact of the change to the design values is graphed, the user may easily grasp the impact of the change to the design values.

As described above, according to the present embodiment, the server device 200 includes the processing unit 202. The processing unit 202 calculates the distortion amount representing the amount of distortion generated in the via V of the printed circuit board PCB (more specifically, the inside of the via V) based on the above-described equation (1), and corrects the calculated distortion amount based on the above-described equation (2). Further, the processing unit 202 calculates the lifetime of the via V based on the above-described equation (3) and equation (4). When the calculated lifetime is out of the optimum range, the processing unit 202 changes design values such as the via diameter within the input setting range, and gives points to the changed design values. Then, the processing unit 202 outputs a graph indicating the impact degree according to the point to the display device 120. Since a graph indicating the impact degree caused by the design change of the via V is output, the user may easily grasp the impact of the design change of the via V.

Although the preferred embodiments of the present disclosure have been described above in detail, the present disclosure is not limited to the specific embodiments, and various modifications and changes may be made within the scope of the gist of the present disclosure described in the claims. For example, in the above-described embodiment, the optimum condition 80 in terms of cost and miniaturization has been described, but the optimum condition 80 including the total viewpoint may be output.

Further, in the above-described embodiment, descriptions have been made on a case where the selection of the changeable factor and the input of the setting range are performed after the lifetime based on the initial design value is calculated. However, the timing of the selection of the changeable factor and the input of the setting range may be changed appropriately. For example, when the initial design value is input on the first input screen, since the user grasps the changeable factor and the setting range, the input may be performed at the timing of inputting the initial design value on the first input screen. In this case, the first input screen may be provided with fields in which the changeable factor is selected and the setting range is input. A screen on which the selection of changeable factors and the input of a setting range are performed may be displayed between the first input screen and the second input screen. In some cases, the optimum lifetime may be calculated based on the initial design value. Therefore, it is preferable to select the changeable factor and input the setting range in the case of a lifetime failure in which the optimum lifetime has not been calculated, since the burden on the user is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:

calculating a distortion amount that represents an amount of distortion generated in a via of a printed circuit board based on a following equation, $$\Delta\varepsilon=\{(L\times\alpha\times\Delta t\times E)/(D\times T)\}\times m\times\beta\times\gamma\times\eta$$

here, $\Delta\varepsilon$ is the distortion amount, L is a via length, $\alpha$ is a thermal expansion coefficient of a substrate of the printed circuit board, $\Delta t$ is a temperature change of an environment in which the printed circuit board is used, E is the Young's modulus of the substrate of the printed circuit board, D is a via diameter, T is a plating thickness inside the via, m is a coefficient obtained by a stress calculation based on a theory of material dynamics and by a stress simulation, $\beta$ is a first coefficient according to an arrangement of lands, $\gamma$ is a second coefficient according to an arrangement density of vias on the printed circuit board, and $\eta$ is a third coefficient according to a positional deviation between vias and lands;

calculating a lifetime of the via based on a following equation, $M=N/(n\times365)$ here, M is the lifetime of the via, n is a number of temperature changes, and N is a number of cycles of the lifetime, which satisfies a following equation, $N^x=C/\Delta\varepsilon$ here, x is a fatigue ductility index of a material used for plating, C is a fatigue ductility coefficient of the material used for plating, and $\Delta\varepsilon$ is the distortion amount;

changing, when the calculated lifetime is outside a first setting range, at least two design values of the via length, the thermal expansion coefficient, the Young's modulus, the via diameter, or the plating thickness within a second setting range corresponding to the at least two design values respectively;

giving points of two perspectives affected by the change for each of the at least two changed design values; and outputting a graph that indicates an impact degree according to the points of the two perspectives for each combination of the at least two design values.

2. The non-transitory computer-readable recording medium according to claim 1, the process further comprising:

determining whether the calculated lifetime of the via is out of the first setting range by comparing the calculated lifetime of the via with the first setting range set as a number of years required for the via.

3. The non-transitory computer-readable recording medium according to claim 1, the process further comprising:

newly calculating the lifetime based on the at least two changed design values; and outputting the graph that indicates an impact degree according to a partial lifetime and the points of the two perspectives corresponding to the partial lifetime, the partial lifetime being included in the first setting range among lifetimes newly calculated for each combination of the at least two design values.

4. The non-transitory computer-readable recording medium according to claim 1, the process further comprising:

newly calculating the lifetime based on the at least two changed design values; and outputting the graph that indicates an impact degree according to a partial lifetime, the points of the two perspectives corresponding to the partial lifetime, and a sum of the points of the two perspectives, the partial lifetime being included in the first setting range among lifetimes newly calculated for each combination of the at least two design values.

5. The non-transitory computer-readable recording medium according to claim 3, the process further comprising:

outputting, in the two perspectives, a combination of the partial lifetime and the at least two design values for which the partial lifetime is calculated based on a maximum value of each of the points of the two perspectives.

6. The non-transitory computer-readable recording medium according to claim 1, the process further comprising:

changing the at least two design values to a unique pitch width corresponding to each of the at least two design values within a second setting range corresponding to each of the at least two design values.

7. The non-transitory computer-readable recording medium according to claim 1, wherein the two perspectives are cost and miniaturization.

8. A method for outputting an impact degree, the method comprising:

calculating, by a computer, a distortion amount that represents an amount of distortion generated in a via of a printed circuit board based on a following equation, $$\Delta\varepsilon=\{(L\times\alpha\times\Delta t\times E)/(D\times T)\}\times m\times\beta\times\gamma\times\eta$$

here, $\Delta\varepsilon$ is the distortion amount, L is a via length, $\alpha$ is a thermal expansion coefficient of a substrate of the printed circuit board, $\Delta t$ is a temperature change of an environment in which the printed circuit board is used, E is the Young's modulus of the substrate of the printed circuit board, D is a via diameter, T is a plating thickness inside the via, m is a coefficient obtained by a stress calculation based on a theory of material dynamics and by a stress simulation, $\beta$ is a first coefficient according to an arrangement of lands, $\gamma$ is a second coefficient according to an arrangement density of vias on the printed circuit board, and $\eta$ is a third coefficient according to a positional deviation between vias and lands;

calculating a lifetime of the via based on a following equation, $M=N/(n\times365)$ here, M is the lifetime of the via, n is a number of temperature changes, and N is a number of cycles of the lifetime, which satisfies a following equation, $N^x=C/\Delta\varepsilon$ here, x is a fatigue ductility index of a material used for plating, C is a fatigue ductility coefficient of the material used for plating, and $\Delta\varepsilon$ is the distortion amount;

changing, when the calculated lifetime is outside a first setting range, at least two design values of the via length, the thermal expansion coefficient, the Young's modulus, the via diameter, or the plating thickness within a second setting range corresponding to the at least two design values respectively;

giving points of two perspectives affected by the change for each of the at least two changed design values; and outputting a graph that indicates an impact degree according to the points of the two perspectives for each combination of the at least two design values.

9. An information processing device comprising:

a processor configured to:

calculate a distortion amount that represents an amount of distortion generated in a via of a printed circuit board based on a following equation (1), $$\Delta\varepsilon=\{(L\times\alpha\times\Delta t\times E)/(D\times T)\}\times m\times\beta\times\gamma\times\eta$$

here, $\Delta\varepsilon$ is the distortion amount, L is a via length, $\alpha$ is a thermal expansion coefficient of a substrate of the printed circuit board, $\Delta t$ is a temperature change of an environment in which the printed circuit board is used, E is the Young's modulus of the substrate of the printed circuit board, D is a via diameter, T is a plating thickness inside the via, m is a coefficient obtained by a stress calculation based on a theory of material dynamics and by a stress simulation, $\beta$ is a first coefficient according to an arrangement of lands, $\gamma$ is a second coefficient according to an arrangement density of vias on the printed circuit board, and $\eta$ is a third coefficient according to a positional deviation between vias and lands;

calculate a lifetime of the via based on a following equation, $M=N/(n\times365)$ here, M is the lifetime of the via, n is a number of temperature changes, and N is a number of cycles of the lifetime, which satisfies a following equation, $N^x=C/\Delta\varepsilon$ here, x is a fatigue ductility index of a material used for plating, C is a fatigue ductility coefficient of the material used for plating, and $\Delta\varepsilon$ is the distortion amount;

change, when the calculated lifetime is outside a first setting range, at least two design values of the via length, the thermal expansion coefficient, the Young's modulus, the via diameter, or the plating thickness within a second setting range corresponding to the at least two design values respectively;

give points of two perspectives affected by the change for each of the at least two changed design values; and output a graph that indicates an impact degree according to the points of the two perspectives for each combination of the at least two design values.

10. The information processing device according to claim 9, wherein the processor is further configured to:

determine whether the calculated lifetime of the via is out of the first setting range by comparing the calculated lifetime of the via with the first setting range set as a number of years required for the via.

11. The information processing device according to claim 9, wherein the processor is further configured to:

newly calculate the lifetime based on the at least two changed design values; and output the graph that indicates an impact degree according to a partial lifetime and the points of the two perspectives corresponding to the partial lifetime, the partial lifetime being included in the first setting range among lifetimes newly calculated for each combination of the at least two design values.

12. The information processing device according to claim 9, wherein the processor is further configured to:

newly calculate the lifetime based on the at least two changed design values; and output the graph that indicates an impact degree according to a partial lifetime, the points of the two perspectives corresponding to the partial lifetime, and a sum of the points of the two perspectives, the partial lifetime being included in the first setting range among lifetimes newly calculated for each combination of the at least two design values.

13. The information processing device according to claim 11, wherein the processor is further configured to:

output, in the two perspectives, a combination of the partial lifetime and the at least two design values for which the partial lifetime is calculated based on a maximum value of each of the points of the two perspectives.

14. The information processing device according to claim 9, wherein the processor is further configured to:

change the at least two design values to a unique pitch width corresponding to each of the at least two design values within a second setting range corresponding to each of the at least two design values.

15. The information processing device according to claim 9, wherein the two perspectives are cost and miniaturization.

* * * * *